United States Patent [19]

Diaz

[11] Patent Number: 4,566,093
[45] Date of Patent: Jan. 21, 1986

[54] CONTINUITY CHECK TONE DETECTOR FOR USE WITH A DIGITAL TELECOMMUNICATION SYSTEM

[75] Inventor: Felix V. Diaz, Boca Raton, Fla.

[73] Assignee: Siemens Corporate Res. & Support, Inc., Iselin, N.J.

[21] Appl. No.: 602,794

[22] Filed: Apr. 23, 1984
(Under 37 CFR 1.47)

[51] Int. Cl.[4] ............................ H04J 1/16; H04J 3/14
[52] U.S. Cl. ................................. 370/14; 179/175.2 R
[58] Field of Search ............................ 370/14, 110.2; 179/175.2 R, 175.2 D

[56] References Cited

U.S. PATENT DOCUMENTS 3,683,116 8/1972 Dill .......................................... 370/14
4,081,611 3/1978 Boro et al. ............................... 370/14
4,402,074 8/1983 Cupuis et al. ........................... 370/14

Primary Examiner—Robert L. Griffin
Assistant Examiner—Frank M. Scutch, III
Attorney, Agent, or Firm—Thomas H. Jackson

[57] ABSTRACT

A continuity check tone detector for use with a digital telecommunication system and being designed for detecting continuous tones on voice transmission paths temporarily established between a digital tone generator and the detector across a switching network under control of a switch control unit. The tone detector includes detector interfaces receiving serial tone information from each transmission path in order to derive a digital tone sample and serial control information from the switch control unit in order to convert the same into timing and control signals. A digital signal processor under control of said timing and control signals linearizes and filters received tone samples, measures the power thereof, and supplies corresponding output data. A control processor receives this output data for evaluating the same with respect to individually set power level and predetermined duration for determining the presence of a continuous test tone.

23 Claims, 20 Drawing Figures

FIG. 8

| MACROINSTRUCTIONS | CELL # | MICROINSTRUCTIONS CYCLE # | | | | | | | |
|---|---|---|---|---|---|---|---|---|---|
| | | 0 | 1 | 2 | 3 | 4 | 5 | 6 | 7 |
| LOAD XN INPUT AND FILTER | 0 | LOADX | LDT1 | LDT2 | MOVA3 | LNT2 | STO2 | MOVSC | NOP |
| FILTER | 1, 2 | LOADP | LDT1 | LDT2 | MOVA3 | LNT2 | STO2 | MOVSC | NOP |
| INTERMEDIATE RMS CALCULATION | 3 | SHFST | XFER | MULT | LDACC | MOVA1 | NOP | NOP | NOP |
| LAST RMS CALCULATION | 3 | SHFST | XFER | MULT | LDACC | MOVOUT | NOP | NOP | NOP |
| FIRST RMS CALCULATION | 3 | SHFST | XFER | MULT | MOVA1 | NOP | NOP | NOP | NOP |

FIG. 10

| ADDRESS | INSTRUCTION | ADDR NEXTS | INPEN | RDMAEN | COEFFEN | BUSCREN | OUTEN | TSMEN | TSLEN | PREL | COEFF2 | COEFF1 | COEFF0 | CKPEN1 | CKPEN2 | CKXYEN | WRXAEN | WRSCREN | AO | ACC | SHFTEN | TC | NEXT3 | NEXT2 | NEXT1 | NEXT0 |
|---|---|---|---|---|---|---|---|---|---|---|---|---|---|---|---|---|---|---|---|---|---|---|---|---|---|---|
| 00 | LOADX  | 02 | 0 | 1 | 0 | 1 | 1 | 1 | 1 | 0 | 0 | 0 | 0 | 0 | 1 | 0 | 1 | 1 | 0 | 0 | 1 | 1 | 0 | 0 | 1 | 0 |
| 01 | LOADA  | 02 | 1 | 1 | 0 | 0 | 1 | 1 | 1 | 0 | 0 | 0 | 0 | 0 | 1 | 0 | 1 | 0 | 0 | 0 | 1 | 1 | 0 | 0 | 1 | 0 |
| 02 | LDT1   | 03 | 1 | 0 | 0 | 1 | 1 | 1 | 1 | 0 | 0 | 0 | 1 | 0 | 1 | 0 | 0 | 1 | 0 | 1 | 1 | 1 | 0 | 0 | 1 | 1 |
| 03 | LDT2   | 04 | 1 | 0 | 0 | 1 | 1 | 1 | 1 | 0 | 0 | 1 | 0 | 0 | 1 | 0 | 0 | 1 | 1 | 1 | 1 | 1 | 0 | 1 | 0 | 0 |
| 04 | MOVA3  | 05 | 1 | 1 | 0 | 1 | 1 | 0 | 0 | 0 | 1 | 0 | 0 | 1 | 1 | 1 | 0 | 1 | 1 | 0 | 0 | 0 | 0 | 1 | 0 | 1 |
| 05 | LNT2   | 06 | 1 | 0 | 1 | 0 | 1 | 1 | 1 | 0 | 0 | 0 | 0 | 0 | 1 | 0 | 0 | 1 | 1 | 1 | 1 | 1 | 0 | 1 | 1 | 0 |
| 06 | STO2   | 07 | 1 | 1 | 1 | 1 | 1 | 0 | 0 | 0 | 0 | 0 | 0 | 1 | 1 | 1 | 0 | 0 | 0 | 0 | 0 | 0 | 0 | 1 | 1 | 1 |
| 07 | MOVSC  | 08 | 1 | 1 | 0 | 0 | 1 | 0 | 0 | 0 | 0 | 0 | 0 | 1 | 1 | 1 | 0 | 1 | 1 | 0 | 0 | 0 | 0 | 1 | 1 | 1 |
| 08 | SHFST  | 09 | 1 | 1 | 1 | 1 | 1 | 1 | 1 | 0 | 0 | 0 | 0 | 0 | 1 | 0 | 1 | 1 | 1 | 0 | 0 | 0 | 0 | 1 | 0 | 1 |
| 09 | XFER   | 0A | 1 | 0 | 1 | 1 | 1 | 0 | 0 | 0 | 0 | 0 | 0 | 1 | 1 | 1 | 0 | 1 | 0 | 0 | 0 | 1 | 1 | 1 | 0 | 0 |
| 0A | MULT   | 0B | 1 | 1 | 1 | 1 | 1 | 1 | 1 | 0 | 0 | 0 | 0 | 1 | 1 | 1 | 1 | 1 | 1 | 0 | 0 | 1 | 1 | 1 | 0 | 1 |
| 0B | LDACC  | 0E | 1 | 1 | 1 | 1 | 1 | 1 | 1 | 0 | 0 | 0 | 0 | 0 | 1 | 0 | 1 | 1 | 0 | 1 | 0 | 1 | 0 | 1 | 1 | 0 |
| 0C | NOP    | 0D | 1 | 1 | 1 | 1 | 1 | 0 | 1 | 0 | 0 | 0 | 0 | 1 | 1 | 1 | 0 | 1 | 1 | 0 | 0 | 1 | 0 | 1 | 1 | 1 |
| 0D | NOP    | 0D | 1 | 1 | 1 | 1 | 1 | 0 | 1 | 0 | 0 | 0 | 0 | 1 | 1 | 1 | 0 | 1 | 1 | 0 | 0 | 1 | 0 | 1 | 1 | 1 |
| 0E | MOVA1  | 0D | 1 | 1 | 1 | 1 | 1 | 0 | 1 | 0 | 0 | 0 | 0 | 1 | 1 | 0 | 0 | 1 | 1 | 0 | 0 | 1 | 0 | 1 | 0 | 1 |
| 0F | MOVOUT | 0D | 1 | 1 | 1 | 1 | 0 | 0 | 1 | 0 | 0 | 0 | 0 | 1 | 1 | 1 | 1 | 1 | 1 | 0 | 0 | 1 | 0 | 1 | 1 | 1 |

FIG. 12

| P17 | | | | | | | |
|---|---|---|---|---|---|---|---|
| SQ | LED | SVC | CL | EXER | ER2 | ER1 | T |

- 1: TONE ON
- 1: ERROR #1
- 1: ERROR #2
- 0: EXERCISE
- 0: CLEAR
- 1: OUT OF SERVICE
- 1: L.E.D. ON
- 0: SEQUENCER ERROR

FIG. 13

| $B^7$ | | | | | | | $B^0$ |
|---|---|---|---|---|---|---|---|
| E | AT2 | AT1 | AT0 | R | FR4 | FR3 | FR2 |

- N: FRAME # (EQUIVALENT TO CCT #)
- 0: RESET CCT #N
- ATTENUATION
- 0: ENABLE CCT #N

CONTINUITY CHECK TONE DETECTOR FOR USE WITH A DIGITAL TELECOMMUNICATION SYSTEM

BACKGROUND OF THE INVENTION

The present invention is related to pulse code modulated time division telecommunication systems and, more specifically, to a continuity check tone detector for use with such a system.

A main characteristic of digital telecommunication systems is that subscribers connected to a switching center of the digital telecommunications network in contrast to previous analog telecommunications networks are no longer physically connected with each other when communicating. The generated analog tone signals are sampled, digitalized and arranged in a pulse frame which is processed in the switching center in order to the respective samples be routed to the receiving subscribers. The digital tone samples are converted into analog signals at the receiving end and the original analog signal is reconstructed. This approach requires extensive control information not just for establishing and releasing connections but also for processing of the pulse frames. The control information related to signals on voice transmission paths may be called speech address information and control information regarding procedures, as call connect and release is recognized as signalling formation.

"Common channel signalling" is a further characteristic of various digital telecommunications systems. In this case signalling information is transmitted separate from the speech information and across different transmission paths. The signalling information correspondingly also includes signalling address information in order to specify subunits of the telecommunications system selected to receive corresponding pieces of signalling information.

This structure of having voice transmission paths separated from signalling transmission paths requires individual measures for testing of speech path continuity. Such continuity tests are set up on a link by link basis whereby a connection is set up between a tone generator of the telecommunication system and the continuity check tone detector across a temporary speech transmission path to be tested. A continuous tone is generated, sent across this temporary speech transmission path and received at the far end of the connection by the continuity check tone detector which evaluates tone frequency, level and duration.

In a conventional analog telecommunication system such task would be performed by analog measuring devices. The use of such equipment in conjunction with a digital telecommunication system, however, would unnecessarly complicate this test. The generated analog signal, i.e. the continuous test tone had to be digitalized, transmitted across the selected speech transmission path to be tested, reconverted at the far end and the reconstructed analog signal then had to be measured. Such a design would unnecessarly require additional codecs and filters and affect the stability of the testing system. Filtering of the received analog tone would be necessary in order to eliminate undesired noise and the filtered analog signal had to be thresholded for a root mean square measurement when determining the signal level.

SUMMARY OF THE INVENTION

It is, therefore, a main object of the present invention to provide a continuity check tone detector especially for use with a pulse code modulated time division telecommunication system and perferably directly integrated into the same.

It is another object of the present invention to provide such an improved continuity check tone detector of purely digital design which makes fully use of the characteristics of a digital telecommunication system in order to check speech path continuity.

It is another object of the present invention to provide for such a continuity check tone detector which is suitable for taking measurements on a real time basis and is designed to communicate with the remainder of the telecommunications system, especially its main control in order to render it possible to automate such continuity tests.

Still another object of the present invention is to provide for such a continuity check tone detector for use with a pulse code modulated time division telecommunication system which system is adapted to be connected to a plurality of voice transmission lines, provides common channel signalling and includes line trunk groups which are connected to a respective group of the transmission lines. The line trunk groups are composed of line truck units each constituting an interface unit to a respective group of transmission lines, a digital tone generator for providing call processing tones, a switching network and a switch control unit controlling setup and release of connections and test operations. Such continuity check tone detector shall be arranged within a line trunk group for detecting continuous tones transmitted across temporarily established voice transmission paths.

These objects, as well as other objects which will become apparent from the description which follows are achieved by interface means for receiving serial tone information from said switching network, serial tone address information and serial signalling information from said switch control unit. The interface means are also designed for transmitting test result information to the switch control unit, for deriving tone samples from said serial tone information and for converting said tone address information and signalling information into timing and control signals. Furthermore, there is provided a digital signal processor including means for converting a tone sample into a linearized tone sample, means for digitally filtering said linearized tone sample, and means for measuring the tone level of said filtered tone sample and for generating output data representing the measured tone level. A control processor is connected to receive such output data, timing and control signals for evaluating a measured tone level with respect to programmed tone level and predetermined duration in order to determine the continuous tone, and to generate a corresponding message to the switch control unit.

A main advantage of such a continuity check tone detector is the entirely digital design which complies with the digital concept of a pulse code modulated time division telecommunication system. The continuity check tone detector is composed of three major sections, interfaces to the surrounding telecommunication system which allow the system to communicate with this test device in a form consistent with the prtocol established for the telecommunication system. Accordingly, communication links to this testing device are transparent for the remainder of the system.

This solution reflects the fact that a switch control unit of a line trunk group is the main control for establishing and releasing connections and for test and maintenance purposes within this group. This means with respect to continuity tests that voice transmission paths are selected established and released under control of such switching control unit whereas the continuity check tone detector only performs a test as required and furnishes this test result to the switch control unit. The present solution does not require individual tone generators for generating test tones; the digital tone generator providing processing tones for the telecommunication system may be utilized to generate and supply continuous test tones of selected frequencies. Accordingly, the continuity check tone detector may be programmed by the switch control unit to evaluate received tone samples of a frequency and a tone level both determined at the time of setting up the individual test.

Therefore, no analog measuring equipment is necessary for performing such continuity test. This approach allows to save codecs and filters otherwise necessary for test signal conversion at both ends of the tested voice transmission path and provides for reliable and accurate measurements of the quality of the voice transmission path since input and output parameters are not distorted by analog-to-digital and digital to analog conversion, respectively.

BRIEF DESCRIPTION OF THE DRAWINGS

In the drawings:

FIG. 8 is a table representing a set of macroinstructions and corresponding microinstructions of the digital signal processor in relation to a time frame represented by a subset of the timing control signals;

FIG. 10 is a table which represents the contents of the memory of the microsequencer;

FIGS. 12 and 13 represent diagrams illustrating the format of input/output message bytes of this control processor.

DESCRIPTION OF A PREFERRED EMBODIMENT

Figure 1:
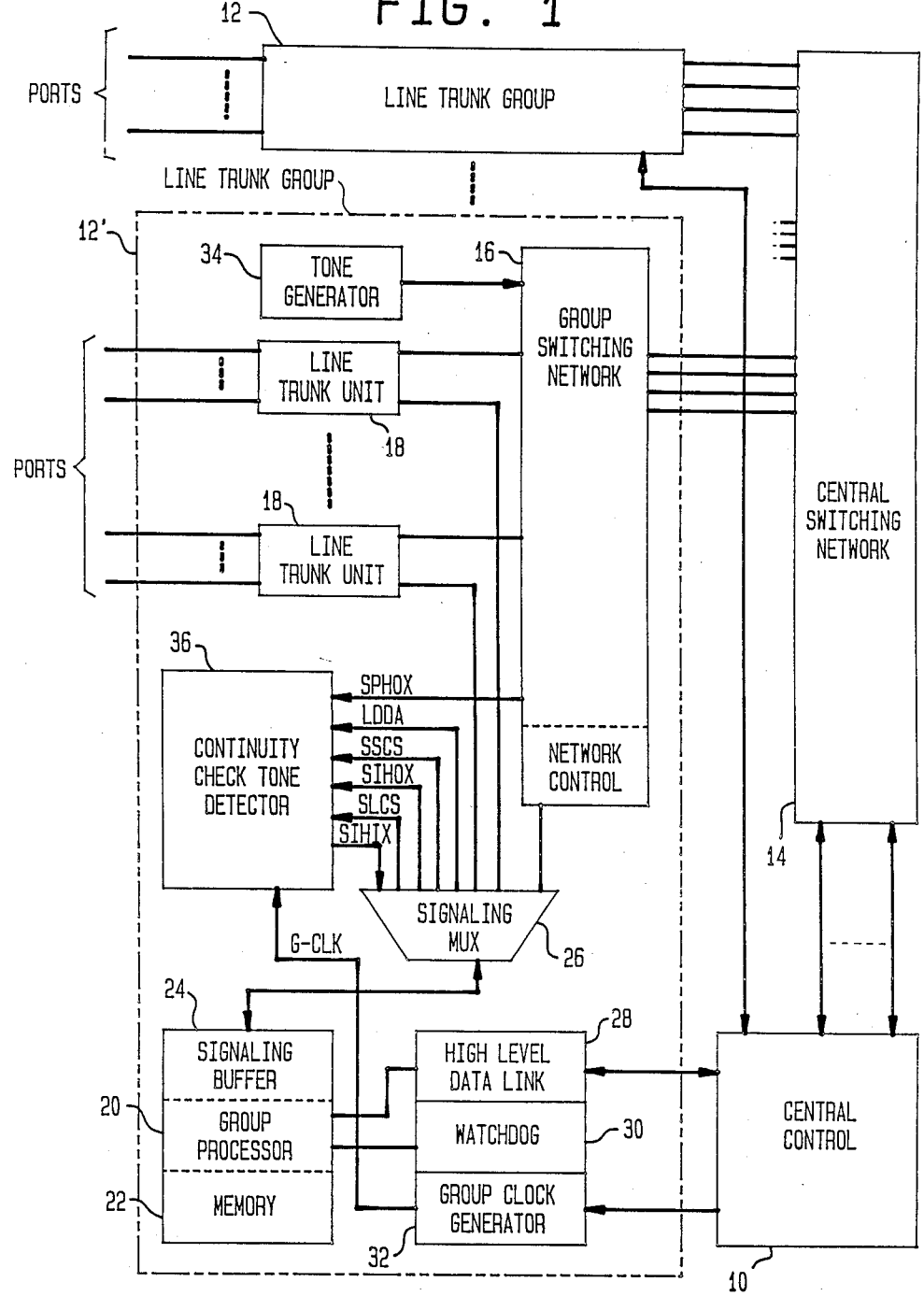
FIG. 1 shows a block diagram representing the basic structure of a switching center of a digital telecommunications network including a continuity check tone detector arranged therein.

The block diagram shown in FIG. 1 illustrates the basic structure of a switching center of a digital telecommunications network in conjunction with a continuity check tone detector. The telecommunication system is represented only to an extent which is desirable for a detailed understanding of the invention.

This system is a digital pulse code modulation (PCM) switching system having central offices designed to function as an end office, intermediate office, tandem switching center or private automatic branch exchange. Each switching center or central office has a two-level de-centralized control structure. A central control unit 10 directs the operations of a plurality of subordinate line trunk groups 12, 12', etc. Each line trunk group is a link to the "outside" world, that is, an interface between local switching equipment and analog or digital lines, i.e., subscriber lines each connected to a subscriber or trunks which interconnect central offices.

A central switching network 14 includes at least one time switch unit which is connected with the line trunk groups 12, 12' across standardized information highways handling speech information. The central control unit 10 is connected to the central switching network 14 and the line trunk groups 12, 12' for exchanging control information. The transfer of such control information is performed in the manner of so-called "common channel signalling" between each of the central offices across trunks dedicated for transferring signalling information.

The detailed function of the central control unit 10 and the central switching network 14 may be conventional for digital PCM switching systems and is of less concern in conjunction with the present invention.

The second control level is implemented by means of the line trunk groups. Each includes a group switching network 16 which is cross-connected with the central switching network 14 and, as schematically indicated, contains a control unit for enabling the network to establish desired cross-connections. The group switching network 16 is commonly shared by a plurality of line trunk units 18 each having, in turn, a plurality of input/output connections designated as ports and establishing the above mentioned connections to the periphery of the telecommunications system. All local switching functions are performed under control of a group processor 20 having its own memory unit 22 and communicating with the remaining sections of the respective line trunk group through a signalling buffer 24 and a signalling multiplexer 26. The group processor 20 is a slave of the central control unit 10 and exchanges data with the same through a high level data link 28. A watchdog circuit 30 is provided for self testing of the line trunk group. Furthermore, a group clock generator 32 receiving a central clock pulse train from the central control unit 10 generates the main clock G-CLK for the line trunk group.

The line trunk group 12' represented in FIG. 1 includes two further units which are connected to the group switching network 16 in the same manner as any line trunk unit 18. One of these units is a digital tone generator 34 connected to the group switching network 16 across a highway which commonly carries in time multiplex all processing tone signals to the group switching network 16.

Another unit is the continuity check tone detector 36 which provides the means to detect a specified single frequency tone during continuity testing of voice trunks that use common channel signalling. Such continuity checks of speech paths are required by CCITT regulations because this signalling mode provides a separate transmission path for signalling information from speech information, and consequently an indication of speech path continuity is not to be verified by means of testing with signalling information.

The continuity check tone detector is composed of a group of eight continuity receivers for use in a pool of receivers for the switching network. At least one continuity test tone is required and is generated by programming the digital tone generator 34 to issue this tone in one of its channels. The continuity check tone detector 36, looked at from the group switching network 16, functions like a connected line trunk unit 18 and uses eight equally spaced time slots. There is one systematic difference to a line trunk unit 18, the continuity check tone detector 36 being a receiving unit only does not require an input to the group switching network 16 and is connected to only one highway representing a speech output of the group switching network and carrying speech output information SPHOX.

The continuity check tone detector 36 performs only relatively low level functions of testing, and it is the group processor 20 and eventually the central control unit 10 which controls all connect, disconnect, and supervision functions required for a test sequence. To this reason the continuity check tone detector receives extensive control information from the group processor 20 through the signalling multiplexer 26.

It may be recognized from the above description that the continuity check tone detector 36, from the system's point of view, appears to be a line trunk unit with a specialized task. Correspondingly, it operates like any such unit under control of the group processor 20 and the central control unit 10, respectively. All connections to the continuity check tone detector 36 and the tone generator 34 supplying the test tones are made via the group switching network 16 initiated by commands of the group processor 20. All connections are one way connections and the group processor 20 provides timing signals as required. In particular, the continuity check tone detector 36 requires supervisory timing signals for maximum test duration and for minimum and maximum release times following the disconnection of the tone generator 34 during the continuity test. Because of this control concept the digital tone generator 34 utilized for a continuity test and the continuity check tone detector 36 must always be located in the same line trunk group such that only one group processor may perform this supervisory function. The group processor also provides testing functions regarding the continuity check tone detector 36 and the digital tone generator 34 on a low priority basis. Such exercises are needed only during low traffic periods to prevent latent faults.

The group processor 20 communicates with the continuity check tone detector 36 via the signalling buffer 24 and the signalling multiplexer 26. Each of the eight receiver channels of the continuity check tone detector 36 is associated with a command location in the output signalling buffer 24 of the group processor 20. A corresponding command byte is distributed every 4 milliseconds.

Similarly, a message byte is scanned every 4 milliseconds and placed into the signalling buffer's input store. All store addresses are determined by the identity of the line trunk unit and the circuit board slot occupied by the continuity check tone detector, 36.

The central control unit administers the pool of continuity check test receivers and is capable of treating each receiver channel as an independent identity as regards its in-service status. This permits any portion of a continuity check tone detector to remain in the pool in the event of a partial failure or when a receiver channel is placed in a maintenance state during periodic or routine testing.

In summary, from the system's point of view the continuity check tone detector 36 is a module performing low level tasks. It interacts with the system by means of a speech highway SPHOX carrying serial PCM information received fro the group switching network. Another highway, the signalling output highway carries signalling output information SIHOX supplied by the group processor 20. Information flow in opposite direction, i.e., signalling input information SIHIX is transmitted along a corresponding signalling highway. The continuity check tone detector also receives a serial signal card select pulse SSCS which is a strobe for the signalling highway, and a corresponding serial line card select pulse SLCS comprising the strobe for the speech highway. A load device address control signal LDDA determines one out of eight addresses for the speech highway, and a master clock signal G-CLK is provided by the group clock generator 32 for synchronizing of the operation of the continuity check tone detector with respect to that of any line trunk group 12.

Figure 2:
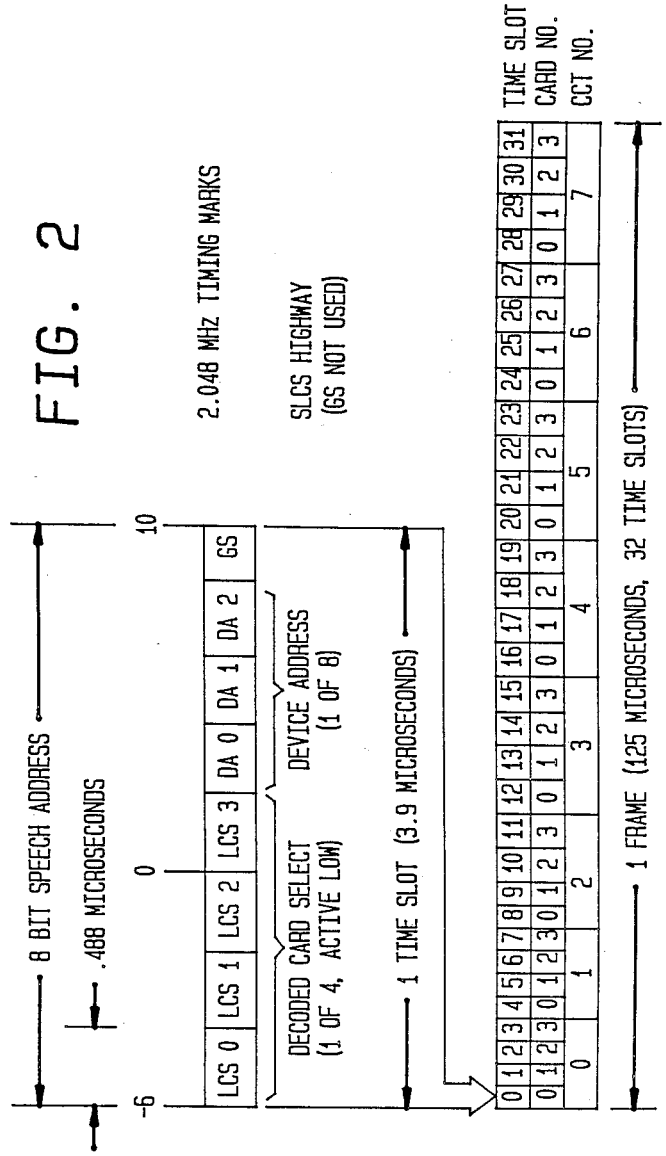
FIGS. 2 and 3 each illustrate a sequence of serial data representing address information for speech and signalling data, respectively in regards to a pulse frame pattern of the telecommunications system.
Figure 3:
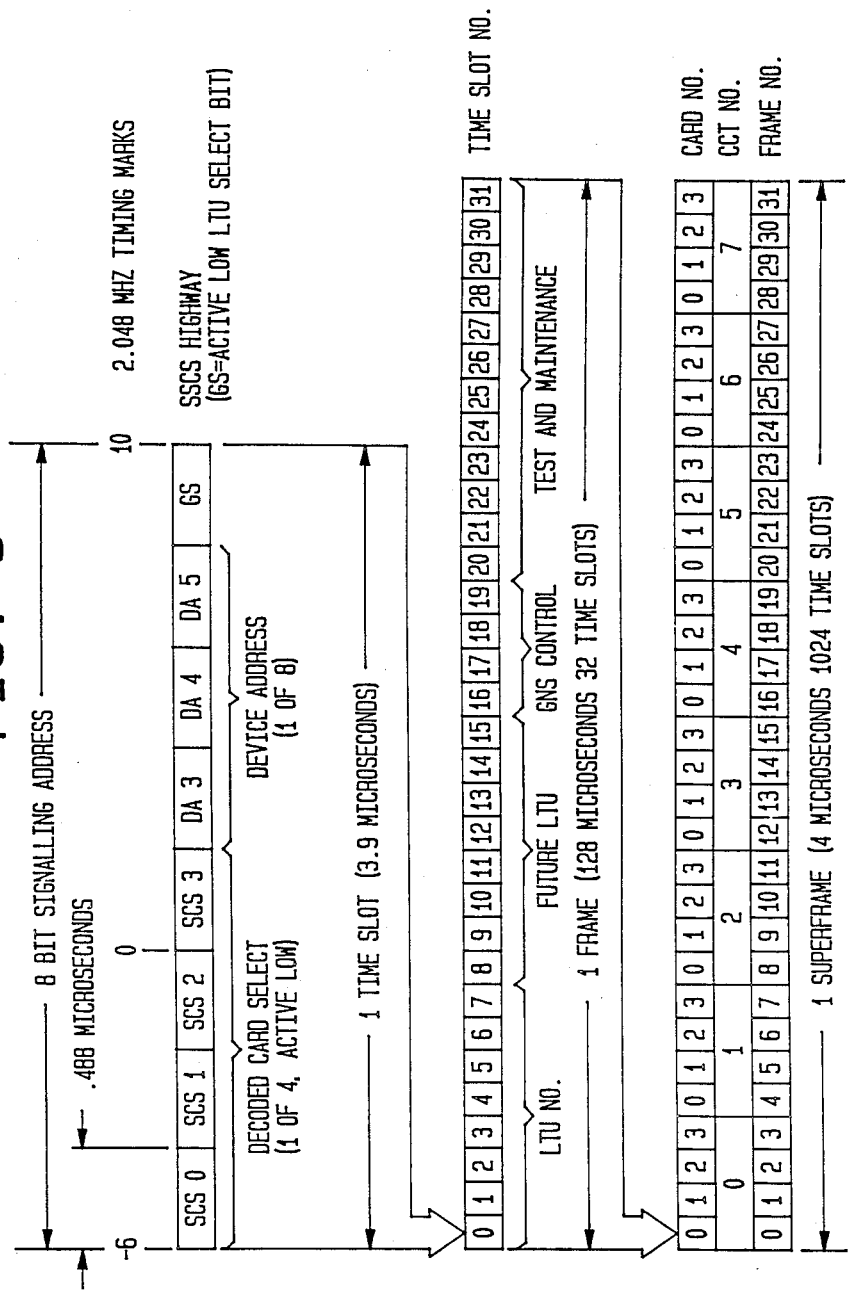

FIGS. 2 and 3 show respective timing diagrams illustrating the speech address sequence, i.e., the serial line card select pulse SLCS and the signalling address sequence, i.e. the serial signal card select pulse SSCS. An 8-bit speech address, as shown in FIG. 2, is composed of four line card select bits LCS0 through LCS3 determining, in combination, a speech highway time slot subset strapping. Three device address bits DA0 through DA2 specify one out of eight devices, that is one of the eight receivers channels of the continuity check tone detector 36. The last bit of the speech address byte is not used in this application. The lower part of the schematic represented in FIG. 2 shows the conventional arrangement of one PCM frame composed of 32 time slots. The allocation of the different card numbers and device numbers is indicated with reference to those time slots and shows the sequential spacing of time slots utilized for speech addresses. The duration of one PCM frame of 125 microseconds is a conventional standard and is derived from the 2.048 MHZ group clock pulse train G-CLK, respective timing marks are indicated.

FIG. 3 represents a similar sequence for the signalling address. This address byte is composed of the signal card select bits SCS0 through SCS4 and of device address bits DA3 through DA5. The last bit is a select bit GS which is low for selecting the corresponding line trunk unit and the continuity check tone detector, respectively. The signalling highway utilizes one pulse frame of 32 time slots for transmitting control information including test and maintenance information to the line trunk units 18 and the group switching network, 16. Accordingly, the signalling address information received by the continuity check tone detector 36 is equally spaced in alignment with a superframe consisting of 32 frames and having a duration of 4 milliseconds. Again, the exact time relationships are determined by the group clock pulse train G-CLK.

After this introduction to the continuity check tone detector 36 and the surrounding switching system, the structure of the continuity check tone detector 36 will now be described in more detail with reference to a functional block diagram shown in FIGS. 4A and 4B. This detector is comprised of several interface devices and of two processing sections. One such section is a digital signal processor for evaluating the received speech information, that is for detecting a test tone. The other section is a control processor which is utilized for decision making, maintenance functions and communication with the group processor 20.

Figures 4, 4A:
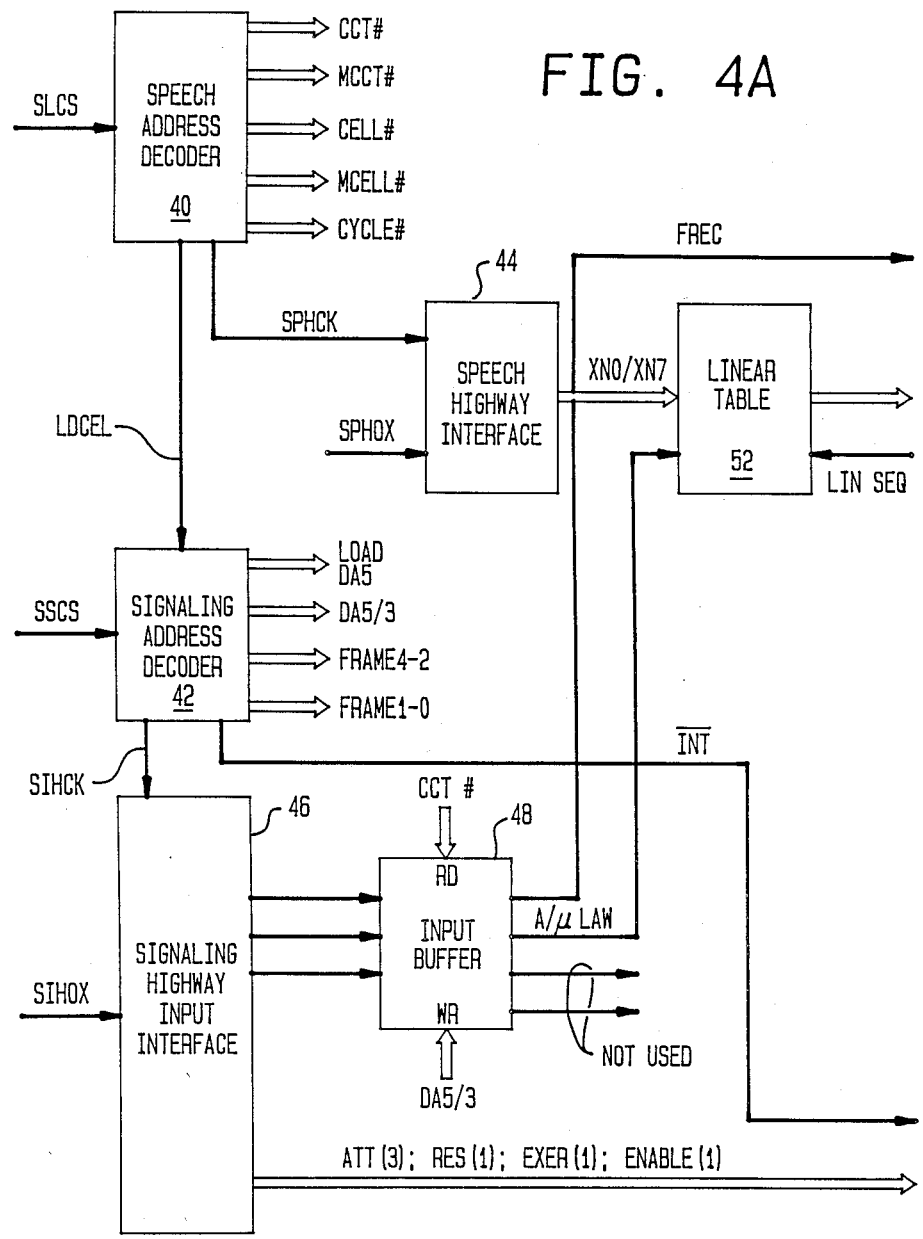
FIG. 4 is a legend of the layout of FIGS. 4A and 4B.
FIGS. 4A and 4B commonly represent a block diagram of the continuity check tone detector illustrated in FIG. 1 and including interface means, a digital signal processor for retrieving tone levels of continuous test tones and a control processor provided for decision making purposes and input/output control of the continuity check tone detector.
Figure 4B:
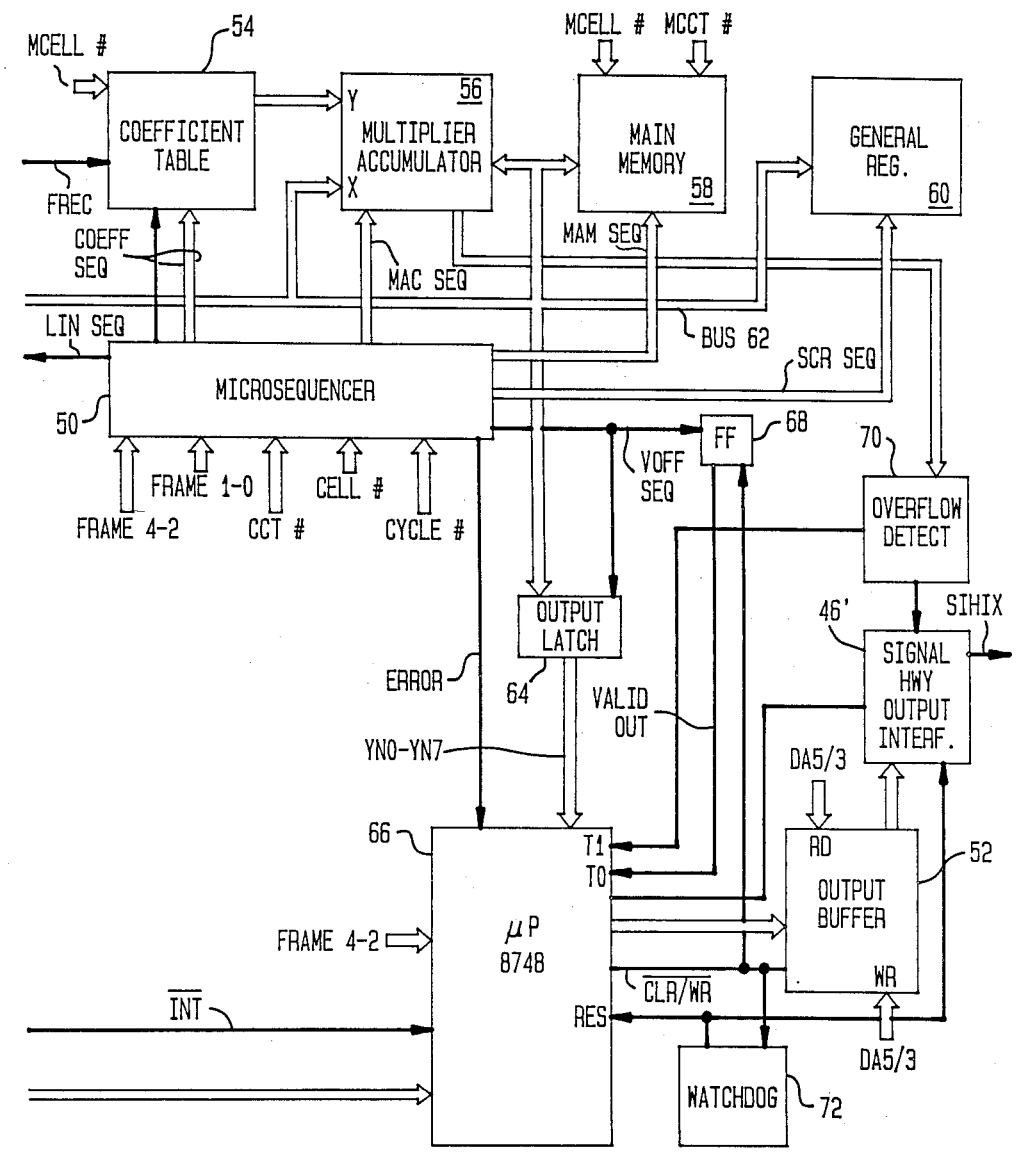
Figure 5:
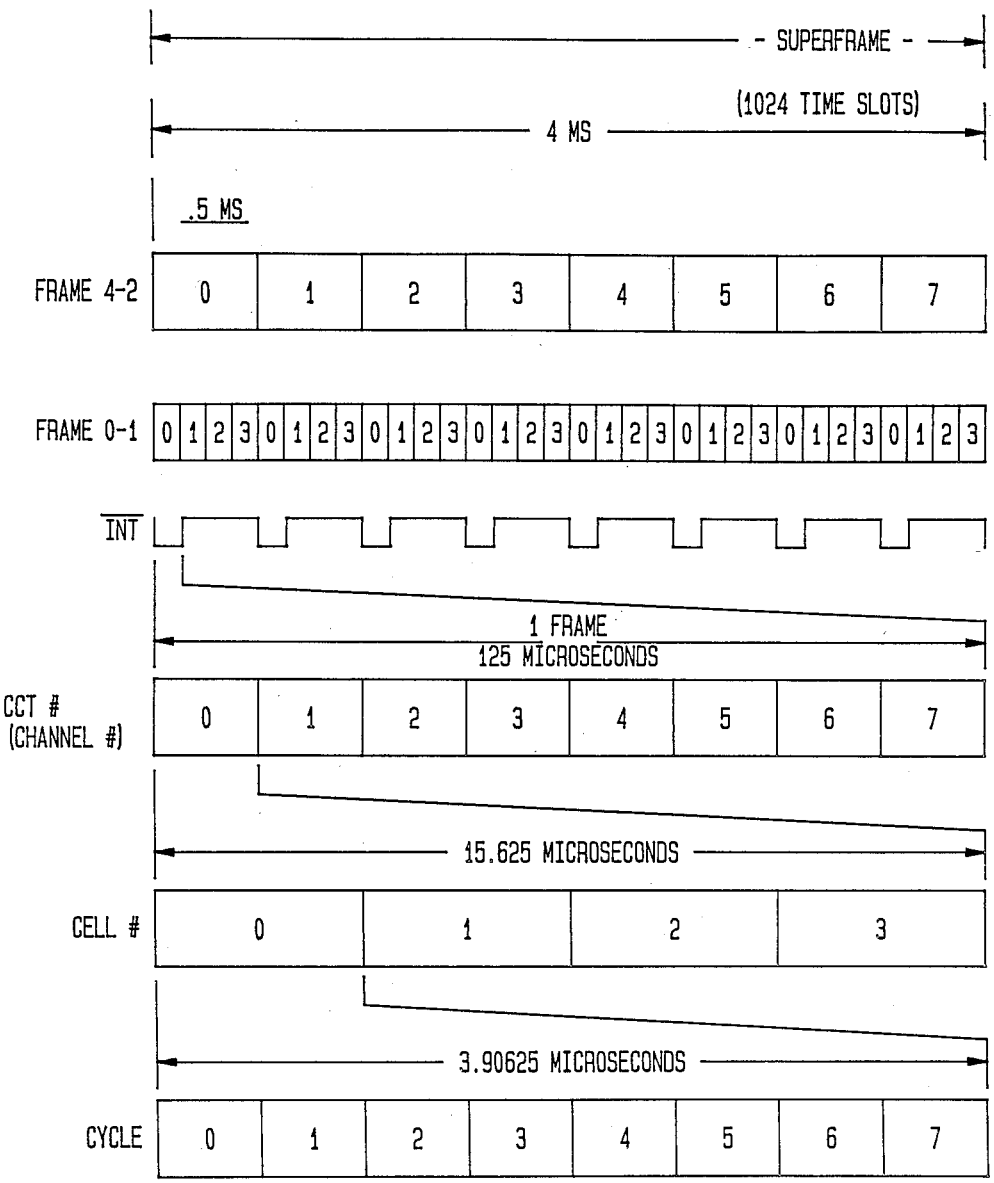
FIG. 5 is a timing diagram representing a sequence of timing control signals utilized for controlling the operation of the continuity check tone detector and being in synchronism with the pulse frame pattern of the telecommunications system.

The input circuitry is represented in FIG. 4A. It includes a speech address decoder connected to receive the serial line card select pulse SLCS. The decoder derives timing signals therefrom which control the operation of the processing units of the continuity check tone detector 36. A timing diagram shown in FIG. 5 illustrates the relationship of these signals which will be described in the order of ascending frequency. A superframe, as mentioned before, is composed of 1,024 time slots and has a duration of 4 milliseconds. Four frame bits designated by FRAME 4-2 and FRAME 1-0, respectively to be described later in more detail are master timing signals which determine frame synchronization. Another timing signal is a receiver channel number CCT# composed of three digits which allocate one of the eight receiver channels of the continuity check tone detector 36 within one pulse frame. The same bit signal is also utilized for memory addressing and to this reason it is furnished a second time with some delay. This signal is designated delayed channel number MCCT#.

The speech address decoder 40 also produces a two-bit time signal designated as cell number CELL#. It provides timing for the digital signal processor. Subsequent cell numbers determine the time pattern of consecutive cells wherein each cell specifies a time period for the execution of one macroinstruction of the digital signal processor. Again, also a delayed cell number MCELL# is provided for timing of memory operations. The duration of a cell is subdivided into eight cycles, each cycle determining the execution time of one microinstruction of the digital signal processor. Accordingly, the speech address decoder 40 generates a 3-bit cycle number CYCLE# allocating each cycle within the duration of a cell.

The speech address decoder 40 generates the above described timing signals with the exception of the frame bit signals FRAME 4-2 and FRAME 1-0 and, in addition, supplies two further timing signals which are utilized within the input circuitry, a clock signal SPHCK for the speech highway and a trigger signal LDCEL for enabling synchronization of speech and signalling highways.

A second decoder, the signalling address decoder 42 is connected to receive the serial signalling card select pulse SSCS and derives therefrom the two frame bit signals FRAME 4-2 and FRAME 1-0, a device address signal DA5-3 which is derived from respective bits of the signalling address byte illustrated in FIG. 3, an interrupt signal INT represented in FIG. 5 and a load enable signal LOAD DA5.

The input circuitry further includes two interface units each connected to receive a respective one of the speech highway output pulses SPHOX and the signalling highway output pulse SIHOX. The speech highway interface 44 is triggered by the mentioned speech highway clock signal SPHCK and is implemented as a simple 8-bit shift register connected to receive the speech highway output pulse, i.e. serial digital input information, for converting the same into an 8-bit parallel data signal designated XN0 through XN7 and representing a digitalized tone sample compressed into an 8-bit format according to the standard companding laws A-Law or MU-Law. Corresponding, the signalling highway input interface 46 is connected to receive serial information in form of the signalling highway output pulse SIHOX. The interface may be implemented a serial-to-parallel converter in form of an 8-bit shift register which outputs six bit signals to be sent to the control processor and to be described later in more detail. Two further output signals are furnished to inputs of an input buffer 48 which has eight register locations each associated with a respective one of the receiver channels of the continuity check tone detector 36. Both bit signals are select signals utilized for controlling the operation of the digital signal processor. The select bit signal FREC is a frequency select bit signal determining one of two possible input tone frequencies, such as 2010 Hz and 1780 Hz, respectively. The other select bit signal referenced A/MU-law determines which one of the companding laws are utilized for digitalizing the continuous tone currently to be tested by the respective receiver channel. The block diagram indicates that the storage locations of the input buffer in case of a write operation are selected by means of the device address signal DA5-3 currently furnished by the signalling address decoder 42. Correspondingly, read operations are performed under control of the current receiver channel number CCT#. Various storage devices are commercially available for implementing such a buffer unit such that further detailed description is deemed not to be necessary.

The described input circuitry connected to receive the signalling highway output pulse SIHOX has a correspondent for providing the signalling highway input pulse SIHIX. This output circuitry is shown in FIG. 4B and is comprised of a signalling highway output interface 46' and an output buffer 52. The function of these circuits is reversed and output information of the continuity check tone detector 36 supplied in parallel is converted into serial data to be transmitted to the group processor 20 through the signalling multiplexer 26 every 4 milliseconds.

Figure 6:
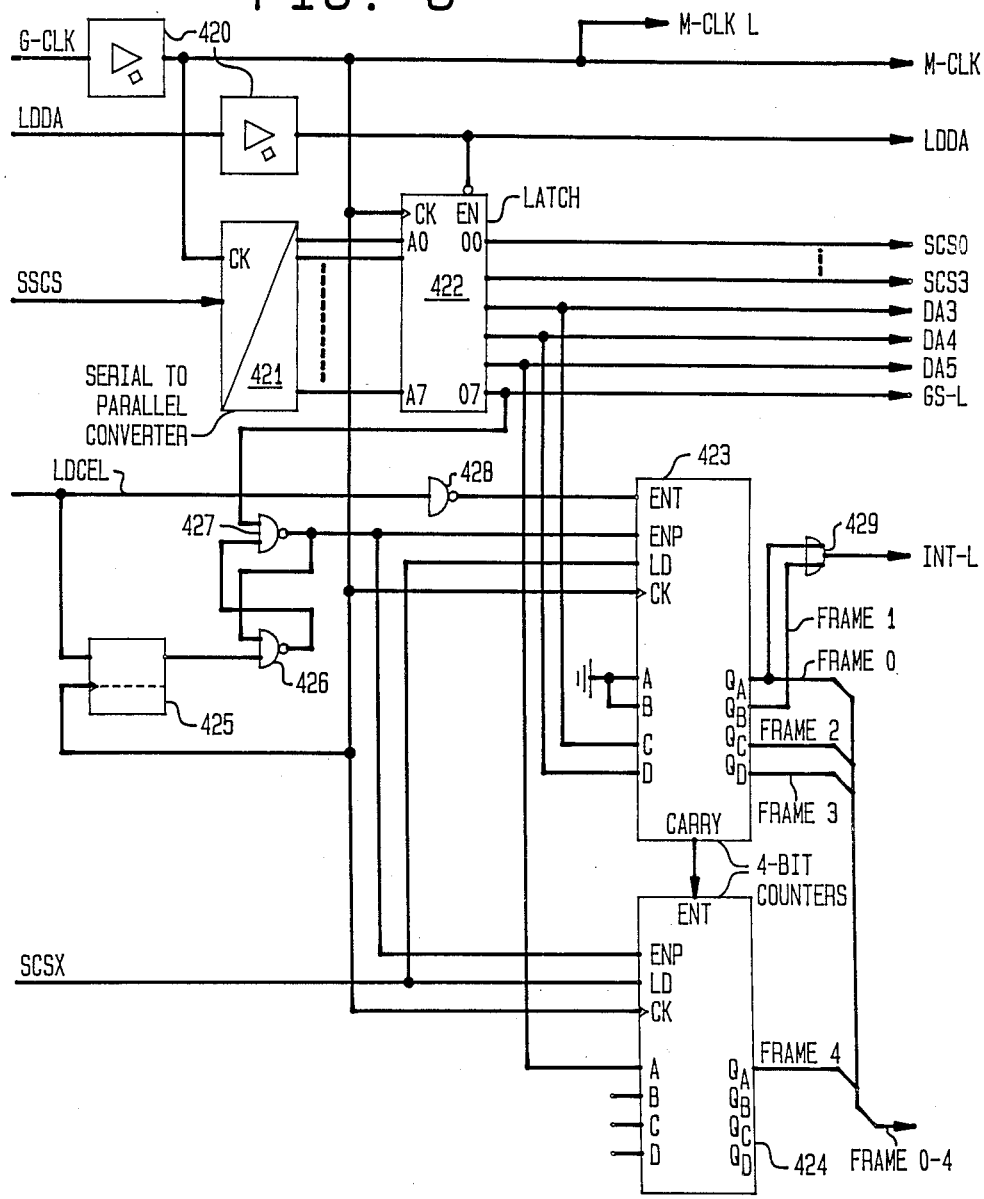
FIG. 6 is a block diagram representing a signalling address decoder which is a part of the interface means of the continuity check tone detector and generates, among others, a subset of the timing control signals represented in FIG. 5.

The input and output circuitry as such is implemented in a conventional manner by means of readily available digital circuits. The interface units and the buffer arrangements follow usual design objectives such that a complete detailed description of all such units is deemed not to be necessary. Only the decoders 40 and 42 are more complex circuit arrangements. To this reason, the signalling address decoder 42 is represented in the block diagram of FIG. 6 and is described in the following in more detail with the understanding that both decoder arrangements are of quite similar design and a repetitive description of the speech address decoder 40 appears superfluous.

The signalling address decoder 42 is provided with line drivers 420 with three state outputs which are connected to receive the group clock pulse train G-CLK and the load device address LDDA, respectively. The serial signalling card select pulse SSCS is furnished to the serial input of a serial-to-parallel converter implemented in the form of a serial shift register 421 with an 8 bit parallel output. The signalling address byte described above in conjunction with FIG. 3 is carried in parallel to an 8 bit latch 422. This latch is triggered by a master clock signal M-CLK derived from the group clock pulse train G-CLK, and is enabled by the load device address signal LDDA which is active low. In accordance with the format of the signalling address byte, the first four outputs of latch 422 provide the four signalling card select signals SCS0 through SCS3. The next following three outputs furnish the device address represented by address signals DA3 through DA5 selecting one of the eight receiver channels of the continuity check tone detector 36. The eighth output signal of latch 422 is the line trunk unit select bit GS which is an active low signal, as indicated.

The signalling address decoder furnishes these output signals of latch 42 as timing control signals to the remainder of the continuity check tone detector 36. The afore mentioned low frequency timing signals FRAME 0 through 4 are derived from the device address bits DA3 through DA5 by means of two 4 bit counters 423 and 424, respectively which are cascaded by a ripple carry signal line. These 4-bit counters are synchronous counters and are triggered by the master clock signal M-CLK. A count operation is enabled when both enable inputs ENT and ENP are high.

According to this circuit feature, a logic network is provided which allows for resetting of the enable input ENP of the first counter 423. The speech address decoder 40, as mentioned before, derives the active low load control signal LD CEL from both the load device address control signal LDDA and the line card select bit signal. This load control signal is transmitted to the signalling address decoder 42 and is received at a flip-flop 425 which is clocked by the master clock signal M-CLK in order to generate a reset signal for the second enabling inputs ENP of the 4-bit counters 423 and 424, respectively. The output signal of flip-flop 425 is supplied to one control input of a circuit arrangement composed of two NAND gates 426 and 427, respectively which are interconnected to form a set/reset flip-flop. The second control input of this NAND gate arrangement is connected to receive the line trunk unit select signal GS and the circuit output is commonly connected to the second enabling inputs ENP of 4-bit counters 423 and 424. The first enabling input of the first counter 423 is directly connected to receive the active low load control signal LD CEL through an inverter 428. As can easily be derived from the control input conditions, the output of NAND gate 427 representing the set condition of the NAND gate arrangement becomes high and enables a count only if the group select signal GS is active low in combination with the load control signal LD CEL which controls the input condition at the first enabling input ENT of the first counter 423. In this way, timing signals derived from the signalling highway are synchronized with control signals (like CELL#) from the speed highway, creating the control signals that drive the digital signal processor.

The two 4-bit counters 423 and 424 generate the timing signals FRAME 0 through 4 in accordance with the described input conditions which may be easily understood in conjunction with the illustration of those signals in the timing diagram of FIG. 5. This diagram also illustrates an active low interrupt control signal INT which is derived from the two frame bit signals FRAME 0 and FRAME 1 by means of an OR gate 429.

After this description of the input and output circuitry of the continuity check tone detector 36, the different units of the digital signal processor will now be described in more detail, again referring to the block diagram represented in FIGS. 4A and 4B. The control unit of this digital signal processor is a microsequencer 50 which is triggered by the described timing signals. Further units are a linearization table 52, a coefficient table 54, a multiplier/accumulator 56, a processor main memory 58 and a scratch pad memory 60. All these units are interconnected by means of a bidirectional processor bus 62.

The linearization table 52 is connected to receive the output signals XN0 through XN7 of the speech highway interface 44. Each byte represents a companded speech sample which is to be linearized. The linearization table 52 is a conventional translation table and supports either A-law or MU law linearization on a software selected basis by means of the respective control signal provided by input buffer 48. The resolution of the table is 12 bit plus sign for A-law and 13 bit plus sign for MU-law. Since this linearization is a conventional technique which is standard for PCM digital transmission systems a detailed description of this unit is deemed not to be necessary.

Figure 7:
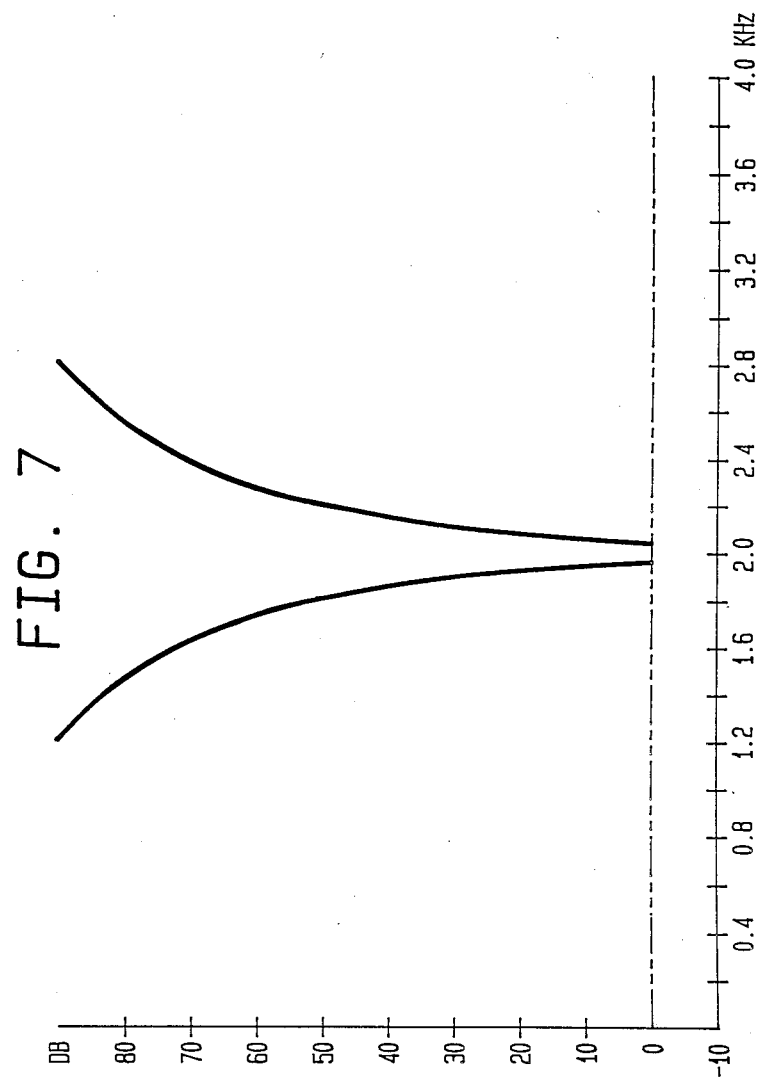
FIG. 7 is a wave form diagram which represents the frequency response of a digital filter made part of the digital signal processor.

The task of the digital signal processor is to a digitally filter eight time division multiplexed linearized PCM tones, to determine the root mean square (RMS) values of the filtered tones and to present them to the control processor for further processing. The filter operation is performed by a digital bandpass filter. A variety of implementations of digital filters is well known in the art. Butterworth or Tschebyscheff recursive filters may be utilized based upon the known bilinear transformation method in order to achieve a frequency response which is represented in FIG. 7 with reference to a 2010 Hz center frequency. In the present application the filter implementation requires the use of the coefficient table 54, the multiplier/accumulator 56 and the scratch pad registers 60. Two different digital filters centered to 2010 Hz and 1780 Hz, respectively are implemented.

Another task of the digital signal processor is to square the filtered linear PCM tone samples and to integrate them. These channel individual summations providing a periodic measure of tone RMS power are furnished through an output latch 64 to the control processor 66 for checking of valid amplitudes and durations. A flip-flop 68 is set by the microsequencer 50 when the output signal of the digital signal processor is valid. Another output interface of the digital system processor is an overflow detector 70 which detects a multiplier/accumalator failure.

The control processor 66 determines the validity of the received RMS tone levels and performs maintenance and test functions, as to be described in more detail. Its operation is monitored by a watchdog circuit 72 which resets the same if a clear signal is not generated in due time. The control processor communicates with the group processor 20 through the signalling highway interface, i.e. the signalling highway input interface 46 in receiving direction and the output buffer 52 and the signalling highway output interface 46' in transmitting direction.

In the following, the digital signalling processor will be described in more detail, especially with respect to the microsequencer 50 and its control function. A set of instructions is provided for this purpose and their characteristics will be explained first. In conjunction with the description of the speech address decoder 40 and the timing signals generated by it, it was pointed out that the term "cell" is utilized to define a time span which is associated with the execution of a macroinstruction of digital signal processor. Each cell is subdivided into eight cycles each of which determining the execution time for a respective microinstruction. FIG. 8 now illustrates schematically in the form of a table the five macroinstructions defined for the microsequencer 50 each occupying respective cells, and the corresponding microinstructions. An explanation for the mnemonic abbreviations is listed in the following listing (TABLE 1).

TABLE I

| NAME | FUNCTION |
| --- | --- |
| NOP | No operation |
| LOADX | Load input Xn and a scaling factor and multiply (no accumulation) |
| LDT1 | Load first delayed sample ($Z^{-1}$), a b1 constant and multiply, store sample temporarily |
| LDT2 | Load second delayed sample ($Z^{-2}$), b1 constant and multiply with accumulation |
| MOVA3 | Move accumulator contents (shifted) to main memory, first location ($Z^{-1}$) |
| MOVSC | Move accumulator contents (shifted) to scratch pad register |
| MOVA1 | Move accumulator contents to main memory first location ($Z^{-1}$) |
| LNT2 | Load main memory ($Z^{-2}$), an A2 constant and multiply with accumulation |
| STO2 | Store scratch pad register into main memory location 2 |
| LOADP | Load scratch pad register in input register, scaling factor and multiply |
| SHFST | Shift MSP (Most Significant Product, i.e. 16 upper bits of the 32-bit multiplication) to LSP (Least Significant Product i.e., 16 lower bits of the 32-bit multiplication and store in scratch pad MSP position |
| LDACC | Load previously stored RMS value in MSP position and 0 in LSP position, with accumulation |
| XFER | Move LSP to Y inputs and scratch pad contents to X inputs |
| MULT | Multiply X by Y without accumulation |
| MOVOUT | Move accumulator contents to output |

Figure 9:
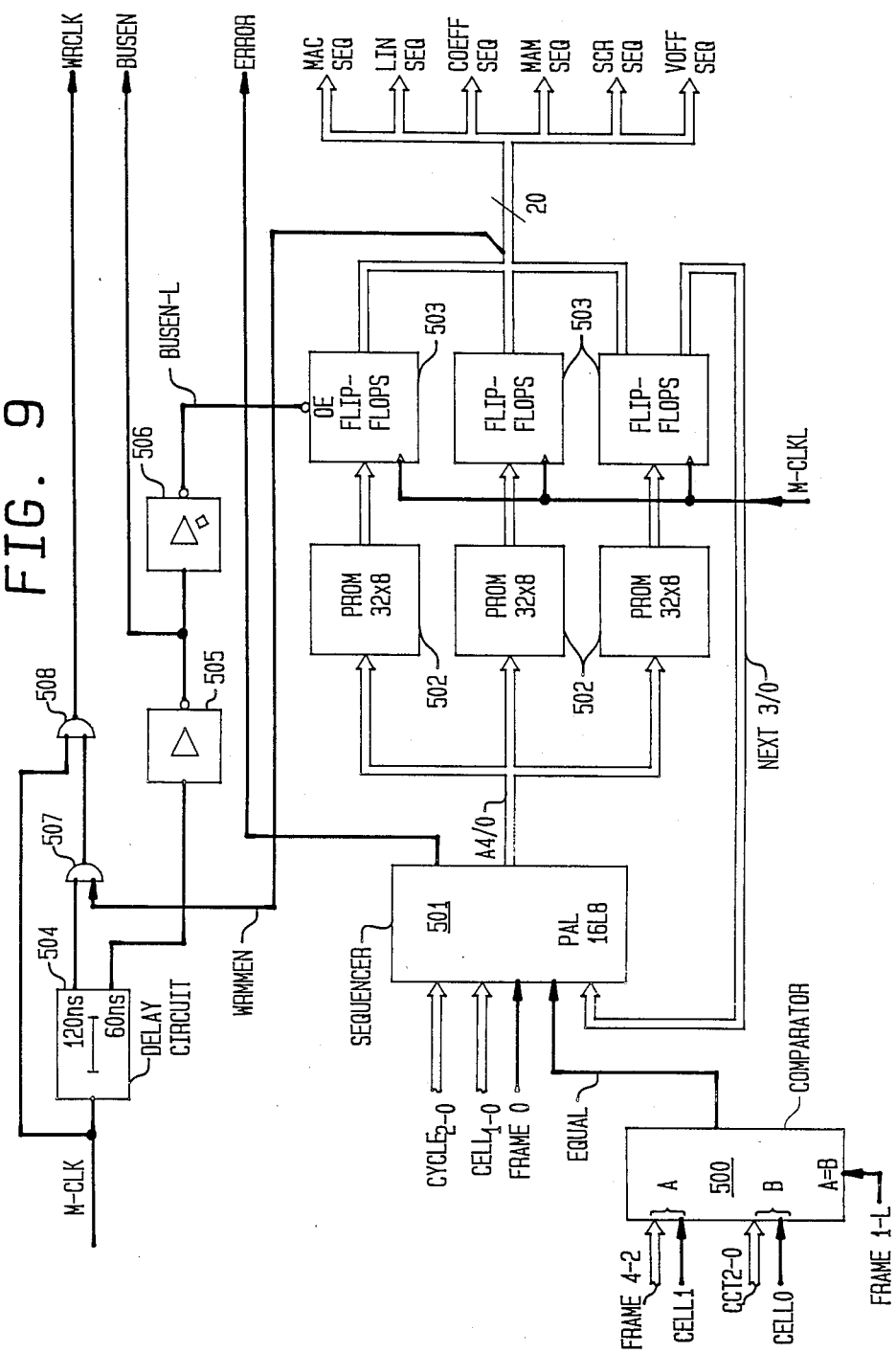
FIG. 9 is a block diagram of a microsequencer constituting the control unit of the digital signal processor including a sequencing device and a memory for storing the micro-code of the digital signal processor.

FIG. 9 represents a block diagram of the microsequencer 50, the control unit of the digital signal processor. The microsequencer 50 is provided with a 4-bit magnitude comparator 500 which is connected to receive the timing signals FRAME 4-2 in conjunction with cell number signal CELL 1-0 at first data inputs A, and the receiver channel number bits CCT 2-0 in conjunction with cell number bit CELL0 at second data inputs B. The active low timing signal FRAME 1-L is received at a control input in order to trigger the comparator 500 for comparing the 4-bit words received at the two sets of data inputs for identity. The operation of this comparator determines the selection of the appropriate microcode in synchronism with the given time frame. Comparator 500 generates an output signal EQUAL if a comparison is successful. This output signal, in fact, determines a jump condition which will become more apparent later.

The comparator output signal EQUAL is one of the input signals of a sequencing device 501 implemented by means of a programmable logic array which may comprise the array circuit PAL 16 L8, a programmable logic array which is commercially available from different manufacturers. The sequencing device 501 also receives the 3-bit cycle control signal CYCLE 2-0 determining the timing of the execution of a microinstruction and the two cell bit signals CELL 1-0 which specify, in combination, a respective one of the cells. A further timing control signal is the frame bit signal FRAME 0.

The sequencing device 501 is further connected to receive four address bits NEXT 3-0 which determine the address of the next microinstruction to be executed. These address bits are received through a feedback loop which will be described later in more detail. The sequencing device generates six output signals. Five of the these output signals are address bits A4-0 and the sixth output signal is an active low error signal ERROR to be described in more detail.

The programming of sequencing device 501 is clearly determined by means of a truth table which is given in form of the logic equations for the generated output signals. The logic equations for the five address bits A4 through A0 are as follows:

$$\overline{A4} = 1$$

$$\overline{A3} = \overline{\text{JUMP}}\cdot\text{NEXT3} + \text{JUMP}\cdot\overline{\text{CYCLE 2}}\cdot\overline{\text{CYCLE 1}}\cdot$$

$$\overline{\text{CYCLE 0}}(\overline{\text{CELL 1}} + \text{CELL 1}\ \overline{\text{CELL 0}})$$

$$\overline{A2} = \overline{\text{JUMP}}\cdot\text{NEXT2} + \text{JUMP}\cdot\overline{\text{CYCLE 2}}\cdot\overline{\text{CYCLE 1}}\cdot\text{CYCLE 0}$$

$$\overline{A1} = \overline{\text{JUMP}}\cdot\text{NEXT1} + \text{JUMP}\cdot\overline{\text{CYCLE 2}}\cdot\overline{\text{CYCLE 1}}\cdot\text{CYCLE 0}$$

$$\overline{A0} = \overline{\text{JUMP}}\cdot\text{NEXT0} + \text{JUMP}\cdot\overline{\text{CYCLE 1}}\cdot\overline{\text{CYCLE 0}}\cdot[\overline{\text{CYCLE 2}}\cdot$$

$$(\overline{\text{CELL 1}}\cdot\overline{\text{CELL 0}} + \text{CELL 1}\cdot\text{CELL 0}) + \text{CYCLE 2}]$$

The above equations include the above mentioned jump condition which is also internally derived by programming of sequencing device 501 in accordance with the following equation:

$$\text{JUMP} = \overline{\text{CYCLE 2}\cdot\text{CYCLE 1}\cdot\text{CYCLE 0}} + \text{EQUAL}\cdot\text{CELL 1}\cdot$$

$$\text{CELL 0}\cdot(\overline{\text{FRAME 0}\cdot\text{CYCLE 2}\cdot\text{CYCLE 1}\cdot\text{CYCLE 0}} +$$

$$\text{FRAME 0}\cdot\overline{\text{CYCLE 2}\cdot\text{CYCLE 1}\cdot\text{CYCLE 0}})$$

Finally, the error condition results from an input condition which is expressed by the following logic equation:

$$\text{ERROR} = \overline{\text{CYCLE 2}\cdot\text{CYCLE 1}\cdot\text{CYCLE 0}}\cdot[\overline{\text{NEXT2}} +$$

$$\overline{\text{NEXT0}} + \overline{\text{NEXT1}}\cdot\overline{\text{NEXT3}} + \text{NEXT1}\cdot\text{NEXT3} +$$

$$\overline{\text{CELL 1} \cdot \text{CELL 0} \cdot (\overline{\text{NEXT3}} + \overline{\text{NEXT1}})]}$$

The logic equations for deriving the five address bits A4–A0 illustrate that the four address bits NEXT 3–NEXT 0 determine the subsequent step in normal operation. This scheme reflects the typical microsequencer application of controlling subsequent steps in consecutive order. However, if a glitch occurs and the serial line card select pulse SLCS, i.e. the speech address information and the serial signalling card select pulse SSCS are no longer in synchronism a realignment has to be initiated. This misalignment condition is detected by means of the described comparator 500 and a forced realignment is initiated by the high status of the output signal EQUAL.

The five address bits A4 through A0 are utilized for selecting a microcode word stored in a respective memory location of a programmable read only memory which can be composed of three 32×8 bit PROM circuits 502. The cascaded arrangement of these three memory circuits allows for establishing a 24-bit memory word whereby each memory circuit supplies one byte. Apparently any other conventional storage device suitable for ths data format could be utilized. This programmable read only memory stores the above described microinstructions. The memory contents are represented in FIG. 9. Each line of this table depicts the contents of one memory location representing a respective one of the microinstructions and an address. Twenty bit of the 24-bit memory word determine the microcode and the last four bits constitute address bits NEXT 3-0 for the consecutively following microinstruction.

The output signals of the programmable read only memory to be described later in more detail are latched by octal D-type flip-flop circuits 503 which are edge triggered by the active low master clock signal M-CLK-L. With respect to one of these flip-flop circuits 503 it is indicated that eight microsignals are triggered by an enable signal of the signal processor bus 62 of the digital signal processor. This bus enable signal BUSEN and its inverse, the active low bus enable signal BUSEN-L are derived from the master clock signal M-CLK which is received at a delay circuit 504 providing two outputs for two clock signals which are delayed by 60 ns and 120 ns, respectively. The clock signal delayed by 60 ns is supplied to a first line driver 505 having an inverting output. The output signal of line drive 505 is the bus enable signal BUSEN and is also supplied to a further line driver 506 and again inverted to form eventually the active low bus enable signal BUSEN-L.

Interesting to note in conjunction with the enabling signal for the signal processor bus 62, is a further timing signal, the write clock signal WR-CLK for the main memory 58 of the digital signal processor. This signal is derived from the master clock signal M-CLK delayed by 120 ns and a write enable signal WRMMEN forming one of the microcode signals still to be described. Both signals are supplied to inputs of an AND gate 507 having an output connected to one input of a further AND gate 508 which receives the master clock signal M-CLK at a second input. The output signal of AND gate 508 is the mentioned write clock signal WRCLK.

The output signals of the D-type flip-flops 503 comprising the 20 bit microcode will now be described. FIGS. 9 and 4B illustrate schematically seven different sequences or control signal groups each supplied to a respective one of the units of the digital signal processor. One sequence is the multiplier/accumulator sequence MAC/SEQ which is comprised of 9 bits. The following description of the respective bits refers to an implementation of the multiplier/accumulator 56 by means of a commercially available circuit TDC 1010J manufactured by TRW. This sequence includes a two complement control signal TC which is high when the multiplier/accumulator inputs X and Y are two's complement numbers. This signal is low when these inputs are unsigned magnitude numbers. A shift enable signal SHIFTEN is low in order to cause the multiplier most significant product MSP to be shifted one bit to the left to include the most significant bit of the least significant product LSP. This shift operation is necessary in order to restore format compatibility after multiplication. The sequence also includes an accumulation control signal ACC which is high when the contents of the output registers are added to the next product generated and the sum is stored back into the output registers at the rising edge of the next clock pulse. Multiplication without accumulation is performed, if the signal is low and the next product generated will be stored into the output registers directly. The accumulator signal ACC must be stable and must be valid over the same period that the input data is valid. The sequence further includes a clock enable signal CKXYEN which is linked by a logical AND operation to the master clock signal M-CLK in order to generate both aforementioned clock signals CLKX and CLKY, respectively.

The multiplier/accumulator 56 is provided with a further clock pulse input CLKP. The respective signal is derived from two corresponding enabling signals CKP EN1 and CKP EN2, respectively which are made part of the microcode. The enabling signal CKP EN1 is used to load data at the beginning of the next microinstruction cycle whereas the enabling signal CKP EN2 is brought low to load data during the second half of the current microinstruction cycle. Both signals are logically linked to the master clock signal M-CLK by means of an AND operation, and the resulting signals, in turn, are linked by an OR operation to form the mentioned third clock pulse signal CLKP for the multiplier-/accumulator 56. A preload signal PREL is brought high to cause all output buffers of the multiplier/accumulator 56 to be at high impedance which disables the output. When the three-state least, most and extended control inputs TSL, TSM and TSX of the multiplier/accumulator 56 are also high, the initial contents of their corresponding output registers can be present to the preload data applied to the output pins at the rising edge of the third clock pulse CLKP. If these control signals are low while the preload signal PREL is high, the contents of the respective output register remain unchanged while the output drivers remain at high impedance. The signals at these four inputs PREL, TSL, TSM and TSX must be valid over the same period that the preload input data is valid. Two enabling signals are included into the sequence referring to the aforementioned control inputs. An enabling signal TSLEN, when high, brings the least significant product output buffer at a high impedance state and correspondingly enabling signal TSMEN forces the most significant product output buffer to its high impedance state.

Another sequence included into the microcode is the linearization sequence LIN SEQ consisting of just 1 bit signal INPEN which is active low and enables the outputs of a programmable read only memory comprising the linearization table 52.

A further sequence designated COEFF SEQ is associated with the coefficient table 54 which is also implemented by means of a programmable read only memory. This sequence includes four bits. One bit signal is an enable signal COEFFEN which is active low and enables the coefficient PROM outputs. The remaining 3 bit signal COEFF0, 1 and COEFF2 provide part of an address for the filter coefficients.

A three bit sequence comprises the control bits for the main memory 58 of the digital signal processor. It includes an address signal A0 which comprises the main memory address bit 0. Control of the main memory write operation is achieved by means of an enable signal WRMMEN which was mentioned before and is logically linked to the master clock signal M-CLK in order to form a clock signal for the memory write operation. A corresponding enabling signal RDMMEN provides the trigger signal for a read operation from the main memory 58.

A two bit sequence SRC SEQ provides the control bits for the operation of the scratch pad registers 60. This sequence includes an enable signal WRSCREN which controls the write operation into the scratch pad memory, and correspondingly a further enable signal RDSCREN enables a read operation from this memory.

The last sequence VOFF SEQ consists again of just one bit which controls the output latch 64 of the digital signal processor. This bit signal OUTEN is an enabling signal for this latch.

FIG. 10 illustrates the contents of the programmable read only memory 502 of the microsequencer 50 in form of a table which represents the address of the sixteen memory locations each storing the described microcode and the address NEXT 3 to NEXT 0 of the following step. For better understanding of the table, the mnemonic code of the microinstructions is included in a column next to the respective memory address.

In the following, a summary will be given of the operation of the described digital signal processor. It is designed for real time application by means of its firmware controlled microsequencer. It is synchronized with external clocks, as described with reference to the timing diagram shown in FIG. 5, and does not require initialization. It receives eight time division multiplexed PCM tones which are equally spaced within one pulse frame and are detected by a corresponding one of the receiver channels which share the use of the circuitry of the digital signal processor. The mentioned timing diagram illustrates that a tone sample XN0 through XN7 is received every 15.625 microseconds and is linearized by means of the linearization table 52. The linearization table is a translation table which supports either A or MU-Law on a software selected basis. The respective select bit is included into the signalling information generated by the group processor 20 and transmitted to the continuity check tone detector 36 as a part of the signalling highway output pulse SIHOX. The resolution of the translation table is 12 bit plus sign for A-Law and 13 bit plus sign for MU-Law.

The linearized tone sample is then filtered by a digital bandpass filter. This filter is implemented in form of the coefficient table 54 and shares the use of the multiplier/accumulator 56, the main memory 58 and the scratch pad register 60 under control of the microsequencer 50 with other tasks of the digital signal processor. The digital filter is a six-pole bandpass filter utilizing three cells, wherein each cell or the associated macroinstruction is capable of performing a two-pole filtering function. With this configuration the digital signal processor can perform many other filter functions and is well suited for any adjustment to various applications. However, any one of such implementations of the digital filter would require reprogramming of the microsequencer 50.

The root mean square (RMS) value of the filtered tone sample is then determined using the subsequent cell. To find the RMS value also requires the use of the multiplier/accumalator 56, the main memory 58 and the scratch pad register 60. In accordance with CCITT requirements for performing a test for continuous tones there is sufficient time for calculating the RMS tone level. Eight straight binary bits represent this level of a filtered tones and 32 samples per channel are used to derive the RMS level. As may be seen from the timing diagram in FIG. 5, this design feature complies with the superframe time pattern and accordingly the RMS level of each individual channel will be up dated every 4 milliseconds. The current RMS tone level is carried to the output latch 64 of the digital signal processor and the described output enable signal is set as main function of the valid out sequence VOFF SEQ. This sets flip-flop 68 which generates a valid output signal VALID OUT furnished to the control processor 66.

The control processor 66 will now be described in more detail. This processor utilizes the commercially available microprocessor chip 8748 manufactured by Intel. The microcomputer system MCS-48 has become well known in the art, the manufacturer has published a variety of manuals and specifications. No general introduction to structure, characteristics, instruction set and programming features is deemed to be necessary and the following description is limited to the specific application of this known microprocessor.

Figure 11:
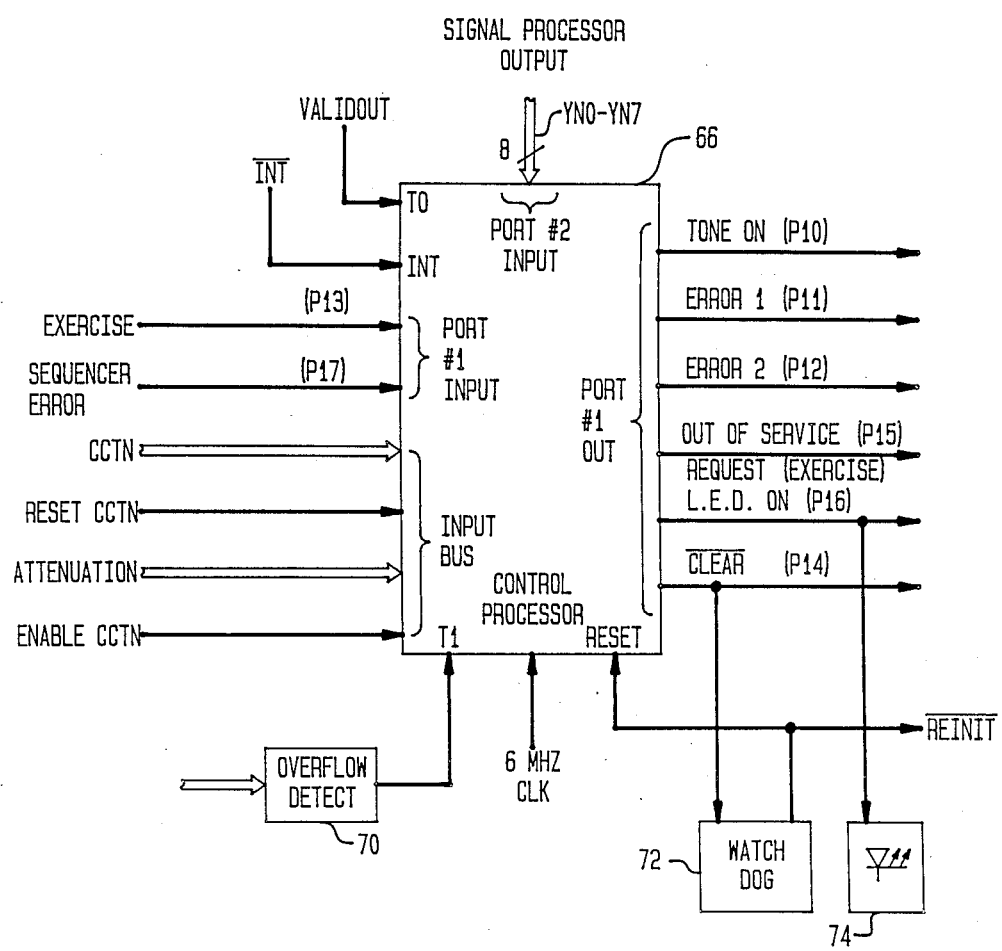
FIG. 11 is a block diagram representing the structure and pin assignment of the control processor.

The structure and pin assignment of control processor 66 is schematically indicated in FIG. 11 and will be described in the following in conjunction with FIGS. 12 and 13 which depict the contents of the bytes assigned to the input and output port PORT #1. The control processor pin 66 has two ports one of which can be used as an input/output port. One of these ports is represented in the block diagram of FIG. 11 as port #1 and the respective byte format is represented in FIG. 12. Eight pins P10 through P17 physically constitute this port. The schematic in FIG. 12 is correspondingly labeled. Pin P17 receives a sequencer error signal which is the error signal generated by the sequencer 501 as illustrated in FIG. 9. This input bit tells the control processor whether or not the microsequencer of the digital signal processor is in the proper state when the initial cycle CYCLE 0 arrives. This bit is active low. Another input signal is the signal applied to pin PIN 13 of port PORT #1. This signal is part of a message byte received from the group processor 20 through the signalling highway input interface 46 as indicated in FIG. 4A. A low level input condition will command the control processor 66 to exercise the message byte hardware. A corresponding test checks the general operation of the hardware of the continuity check tone detector by means of directly connecting the same to the digital tone generator and monitoring the corresponding results. The selected receiver channel of the continuity check tone detector should be disabled while exercising to avoid interferring with a normal test already in progress. If the exercising routine is successful, a signal condition "1" will occur at output pins P10, P11, P12 and P15 still to be described. A zero output on any of these bits will indicate a hardware error which causes the respective channel of the continuity check tone detector be taken out of service.

The remaining pins of port PORT #1 are utilized for output signals. The signal assigned to pin P10 is a tone-on signal which indicates that the control processor 66 has received eight successive valid RMS tone levels or, in other words, a valid test tone has been received by the continuity check tone detector during the last 32 milliseconds. This signal is active high and is immediately reset to zero upon detection of an invalid zone. Pins P11 and P12 furnish error signals. Error signal ERROR #1 indicates either a sequencer error, a time-out error or an overflow condition of the multiplier/accumalator 56. The second error signal ERROR #2 is active high and indicates in this condition a noncorrelation of the receiver channel number CCT# between the control processor 66 and the signalling highway input interface 46. Pin P14 furnishes a clear signal, a multi purpose reset signal which is active low and clears the watchdog circuit 72 and the overflow detector 70, and resets an interrupt condition. Pin P15 is used to output a request OUT OF SERVICE to the group processor 20 via the signalling highway output interface 46'. This active high signal is used to exercise corresponding hardware. The last pin of port PORT #1 is pin P16 carrying an active high signal which is used to deactivate a status indicator 74 implemented by means of a light emmitting diode (LED) when all receiver channels of the continuity check test detector are disabled.

The second port PORT #2 of control processor 66 is utilized as the input port for the measurement data furnished by the digital signal processor. The eight respective pins of the control processor each are connected to a respective one of the outputs of the output latch 64 in order to receive the measurement data byte YN0 through YN7.

The control processor 66 has a true bi-directional bus port which is utilized as an input port. The respective format of the data byte received at this bus port is schematically illustrated in FIG. 13. The three least significant data inputs B0 through B2 are connected to receive a 3-bit signal FRAME # which is equivalent to the receiver channel number CCT # generated by the speech address decoder 40, as described above in conjunction with FIG. 4A. This 3-bit signal provides a count to the control processor 66 that indicates the number of the currently active channel of the continuity test tone detector. As indicated before in conjunction with the timing diagram shown in FIG. 5, this 3-bit counter is incremented every 500 microseconds.

At the pin assigned to bit B3 a reset signal is received which is included into the message byte generated by the group processor 20 and is supplied to the continuity check tone detector through the signalling highway input interface 46. This active low bit signal RESET clears a tone counter of the control processor 66 for the present receiver channel number CCT #. This tone counter of the control processor is incremented upon detection of a valid RMS tone level until eventually eight successive counts are registered which indicate a valid tone and the described signal TONE ON is sent to the group processor 20 via the signalling highway. To this regard the reset signal R indicates the beginning of such a tone detection process.

The next following three bits B4 through B6 are connected to respective output signals of the signalling highway input interface 46. This part of the message byte supplied by the group processor 20 refers to the condition of the tested tone path and specifies an attenuation value. This control information is required by the control processor 66 in order to perform valid RMS tone level comparison. These bits are arranged in one DB steps from 0 to 7 DB using a straight binary representation.

The most significant bit of the data byte received at the bus port is a further enable signal E which informs the control processor 66 whether or not the currently selected receiver channel as specified by the corresponding receiver channel number CCT # will require processing of the filtered tone. If this channel is disabled the control processor 66 is to determine if all channels are disabled and in such a case the described status indicator 74 will be deactivated.

The control processor 66 receives several control signals. A first test input T0 is connected to receive the signal VALID OUT signal from the digital signal processor which indicates that data buffered in the output latch 64 is valid. The second test input T1 is connected to the output of the overflow detector 70 in order to receive the failure signal specifying an overflow of the multiplier/accumulator.

The interrupt intput of the control processor 66 is connected to receive the interrupt signal INT, an output signal of the signalling address decoder 42 as described in conjunction with the timing diagram of FIG. 5. This input shall be activated every 500 microseconds by bringing it to the low condition. An interrupt will bring the control processor 66 to the beginning of its service routine proceeding to the next receiver channel.

The reset input RESET of the control processor 66 is connected to the output of the watchdog circuit 72 which controls the reset routine of the microprocessor. The task of the watchdog circuit 72 is to ensure that the microprocessor generates a clear pulse, as described before, between the occurrance of an interrupt and a load signal. If the clear pulse is not generated the reset signal will be pulled low. When this happens the program of the control processor 66 will return to its initialization routine. The watchdog circuit 72 will generate a reset upon power up. For completeness, the block diagram of FIG. 11 illustrates that the control processor 66 is provided by a 6 MHZ clock pulse train which may be generated by any conventional crystal oscillator.

In the following, the operation of the control processor 66 will be described in conjunction with the flow charts illustrated in FIGS. 14 through 18. The control processor design requires an initialization routine upon power up. This routine is illustrated in the left hand column of FIG. 14. The purpose of this routine is to provide a time-out interrupt in the case that the external interrupt does not occur in time. This routine is started by loading the processor's timer and starting the same as indicated in block 1400 and 1402, respectively. When the interrupt timer of the control processor 66 is enabled a working register R2 is loaded with the receiver channel number CCT#. Thereupon the clear pulse is issued which sets the watchdog circuit 72 and the external interrupt is enabled. These steps are illustrated in blocks 1404 through 1410.

Figure 14:
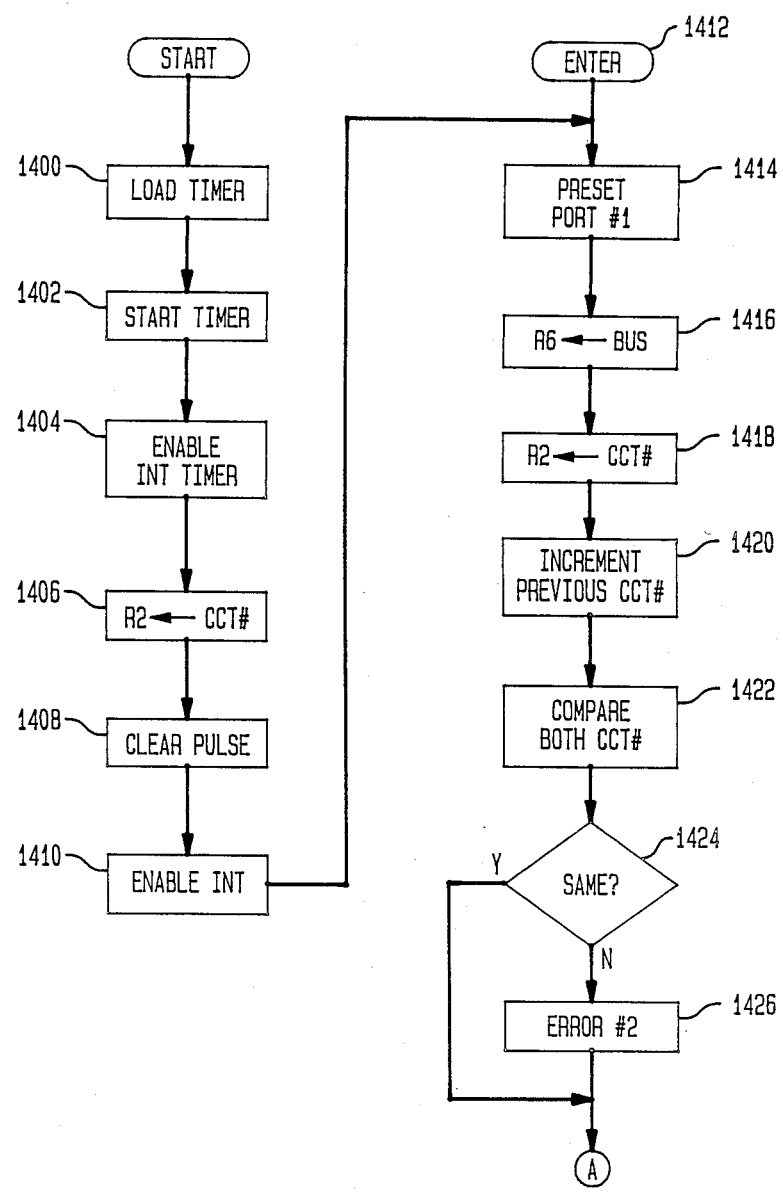
FIGS. 14 through 18 are flow charts illustrating the operation of the control processor.

Upon detection of an interrupt, as indicated in block 1412 the described first port PORT #1 is preset, see block 1414. At this time the control data present on the bus port of the control processor 66 is loaded into a working register R6 and the receiver channel number is entered into the second nibble of the working register R2. These two loading steps are illustrated in blocks 1416 and 1418, respectively. The receiver channel number stored in the other nibble of this working register is then incremented. Now the contents of both nibbles should be identical during normal operation. This condition is tested in the next step and the error signal ERROR #2 will be set in the message byte if this condition is not met in time. The previously described steps are represented in FIG. 14 in blocks 1420 through 1426.

During normal operation of the control processor the test for identity of both receiver channel numbers is successful and the control processor 66 proceeds to perform his decision making routine. The start of this routine is illustrated in the flow chart shown in FIG. 15. The initial conditions for this decision making routine are set in accordance with blocks 1500 and 1502, the attenuation level specified for the current receiver channel is loaded into working register R4 and a corresponding mask is set in working register R5; Furthermore, it is tested if this receiver channel has not been disabled. If the current receiver channel is disabled, a global enable flag for the control processor 66 will be reset and after a delay of 40 microseconds the control processor will continue with an OUT OF SERVICE routine to be described later.

Normally the respective receiver channel is enabled and the test represented by block 1502 will be successful. This condition results in setting the mentioned global enable flag as represented by block 1508 and in preparing the tone counter. What this means is the counter contents are checked for having been reset to zero otherwise it is cleared. After clearance of this counter the time-out for a valid output of the digital signal processor is started. At this point of the program flow the control processor 66 is ready for the evaluation of the output data received from the digital processor through intput port PORT #2. The above described tone counter routine is represented by blocks 1508 through 1516 of FIG. 15.

Figure 15:
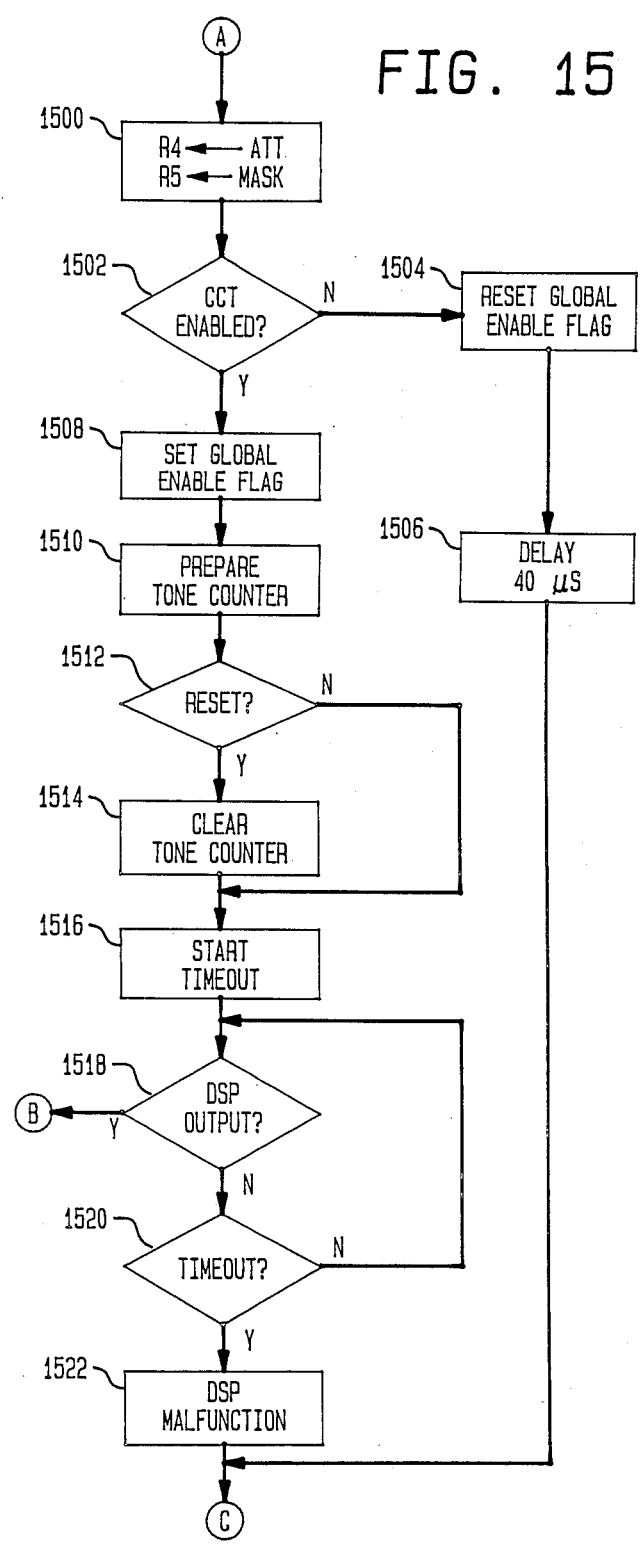
Figure 16:
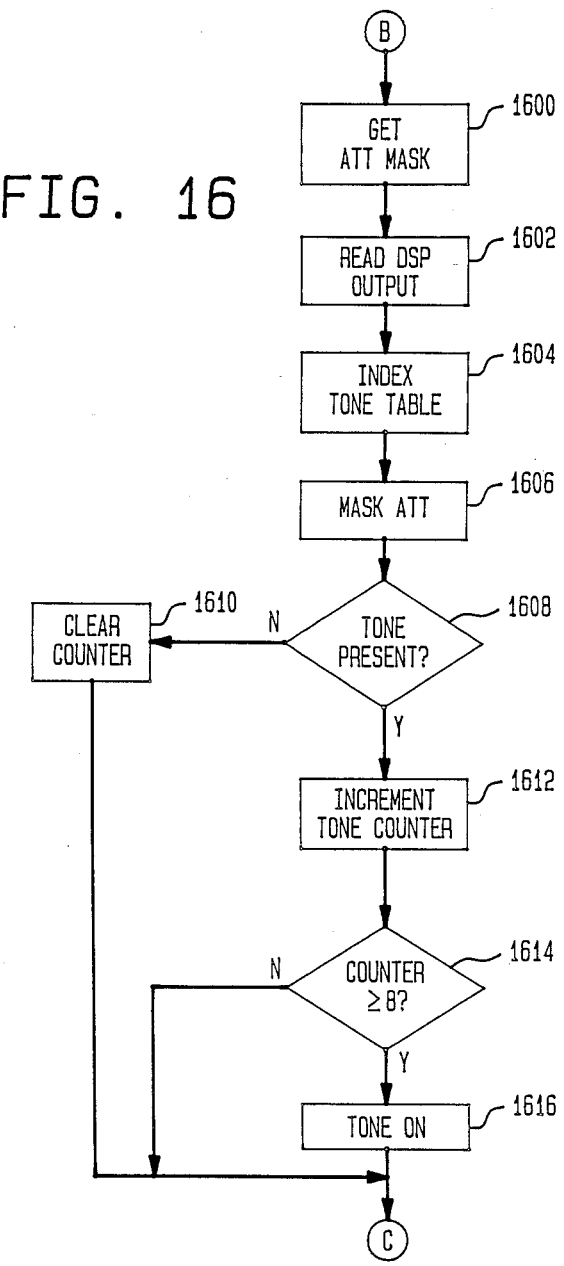

In order to conclude the description of the flow chart shown in FIG. 15, let it be first assumed that the digital signal processor does not supply a valid output signal within at least 125 microseconds after the negative edge of the general interrupt signal INT. In this case the time-out loop represented by blocks 1518 and 1520 which holds the control processor 66 in a waiting status will be discontinued and a malfunction of the digital signal processor, as indicated by block 1522 has occurred. In this case the described error bit signal ERROR #1 of the output message byte of the control processor 66 is set and the control processor 66 enters into the OUT OF SERVICE routine still to be described.

Normally, a valid output byte is furnished by the digital signal processor within the given time period, i.e. the test represented in block 1518 of FIG. 15 is successful. In this case, the control processor 66 proceeds with evaluating the current output data received from the digital signal processor. This routine is shown in the flow chart of FIG. 16. Blocks 1600 through 1606 illustrate a subroutine which masks the output data byte received from the digital signal processor with the attenuation level specifying the normal attenuation level for the tone path currently assigned to the receiver channel under evaluation. By means of masking the output data with the respective attenuation level a resulting tone level is determined which can be tested for a quality of the measured RMS power which in fact represents a valid tone level. This test is illustrated in block 1608 and leads immediately to clearing the tone counter, see block 1610, if the test fails. Subsequently, the control processor 66 proceeds to the mentioned OUT OF SERVICE routine.

If, however, a valid tone is detected the tone counter will be incremented and the counter contents are tested if already eight or more valid tone samples have been detected. If this test is true the described signal TONE ON of the output message byte of the control processor 66 will be set, otherwise this last step will be omitted and the control processor immediately proceeds to the OUT OF SERVICE subroutine. These last steps of incrementing the tone counter and checking the counter contents are represented in blocks 1612 through 1616 of FIG. 16.

Figure 17:
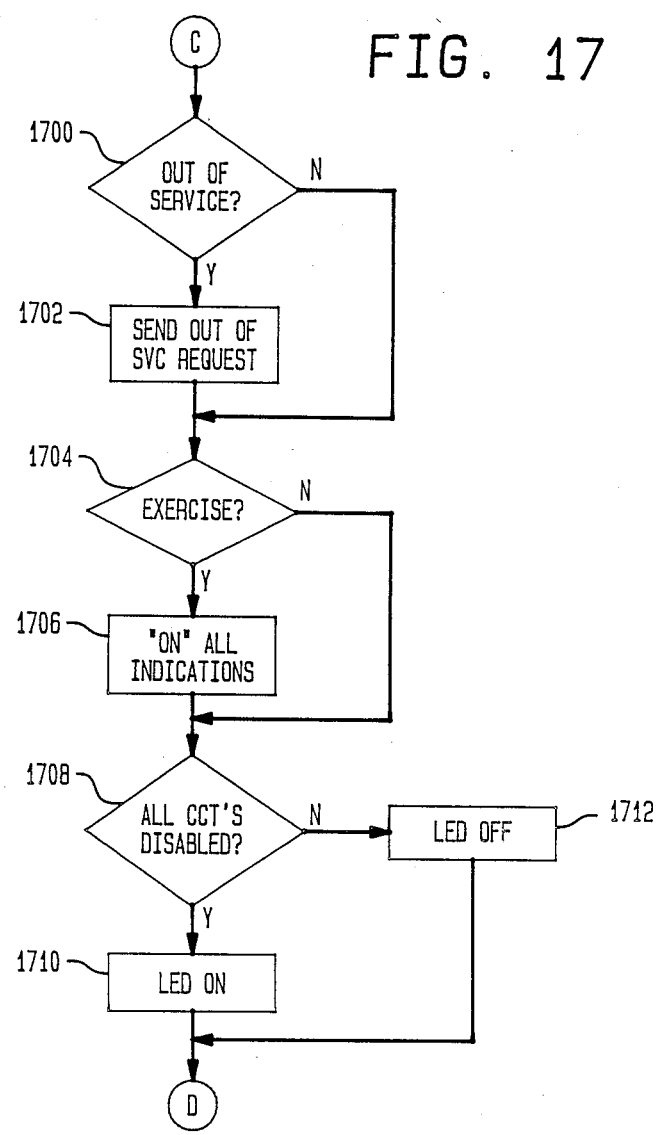

Previously, all different branches of the program flow have been described which lead to the OUT OF SERVICE subroutine which is illustrated in the first two blocks 1700 and 1702 of the flow chart shown in FIG. 17. Any sequencer error, overflow of the multiplier/accumulator 56 of the digital signal processor, time out error or noncorrelation of the updated receiver channel number and the respective number occurring at the signalling interface will cause that the OUT OF SERVICE test is positive which results in setting the respective bit signal in the output message byte of the control processor 66, as shown in block 1702.

Otherwise, this step will be omitted and the processor immediately proceeds to another test shown in block 1704. This test checks if the control processor 66 currently runs in an exercise state, i.e. the control processor is commanded by the group processor 20 to test the message byte hardware. This is achieved by placing a condition "1" for the output signals TONE ONE, ERROR #1, ERROR#2 and OUT OF SERVICE request. This last step illustrated in block 1706 is omitted if the control processor is not in exercise state.

Thereafter, a further test is performed which checks if all receiver channels are disabled and if this is the case the status indicator 76 is put in on condition by means of the respective bit signal of the output message byte. Otherwise, the status indicator is turned off. This subroutine is represented by blocks 708, 710 and 712 of the flow chart shown in FIG. 17.

Figure 18:
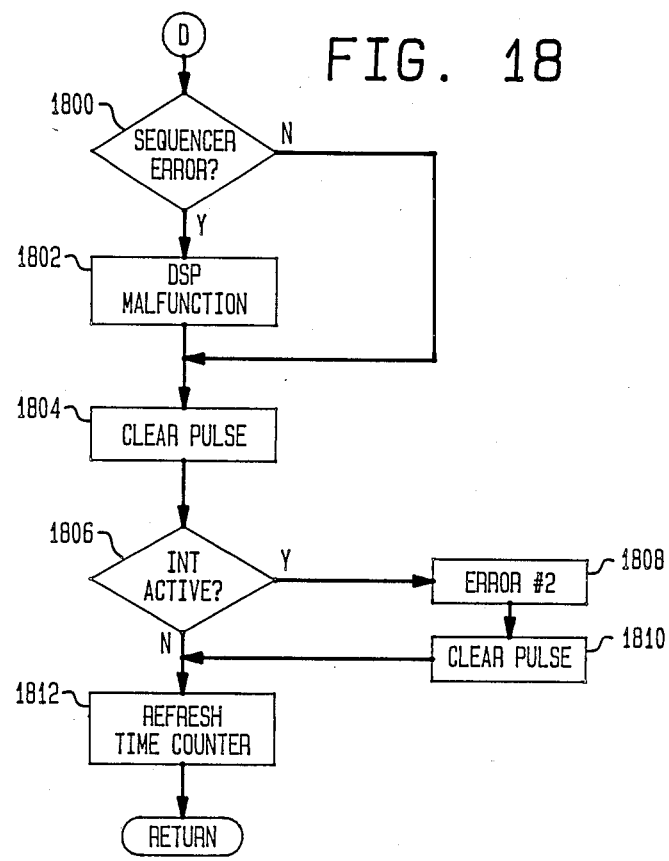

The program of the control processor then proceeds to the final steps illustrated in the flow chart of FIG. 18. Block 1800 represents a test of the condition at the respective pin of input port PORT #1 which indicates in low state that a sequencer error condition has occurred. At the time this test is performed the digital signal processor should have reached the proper state of a respective cycle zero as described before with reference to the operation of the digital signal processor in conjunction with the timing diagram shown in FIG. 5. A high condition at the respective input pin of the control processor 66 indicates that no sequencer error has occurred and the program flow may continue with normal operation. Otherwise, a malfunction of the digital signal processor has occurred and the error bit signal ERROR #1 of the output message byte indicating a malfunction of the digital signal processor is set, as schematically illustrated by block 1802.

Thereafter, the clear pulse resetting the watchdog mechanism is generated as to be seen from block 1804.

In the following test represented by block 1806 it is checked if an interrupt condition at the interrupt input of the control processor is active. In such a case the second error bit signal ERROR #2 is set as represented by block 1808 and a clear pulse restarting the watchdog time is generated as depicted by block 1810. Thereafter the timer counter of the control processor 66 is refreshed as shown in block 1812 and the control processor returns to the begin of the enter routine illustrated in the right hand column of FIG. 14.

There has thus been shown and described a novel continuity check tone detector for use with a digital telecommunication system which fulfills all the objects and advantages sought therefor. Many changes, modifications, variations and other uses and applications of the subject invention will, however, become apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

What is claimed is:

1. A continuity check tone detector for use with a pulse code modulated time division telecommunication system adapted to be connected to a plurality of transmission lines and including interface units for connecting respective groups of transmission lines to said telecommunication system, a digital tone generator for providing call processing tones, a switching network and a switch control unit for supervision of line connection, line release, and test operations, and including a clock generator, said continuity check tone detector being designed for detecting continuous tones transmitted across temporarily established transmission paths and comprising:

detector interface means, connected to said switching network, for receiving serial tone information and for deriving digitally encoded tone samples therefrom, said detector interface means, being further connected to said switch control unit, for receiving serial control information and converting the same into detector timing and control signals;

a digital signal processor connected to receive said detector timing and control signals and said tone samples and including means for converting each tone sample into a linearized tone sample, means for digitally filtering the linearized tone sample and means for measuring the tone level of said filtered tone sample and for generating output data representing the measured tone level; and a control processor connected to receive said output data from said digital signal processor and said detector timing and control signals and including means for evaluating a measured tone level with respect to programmed level and predetermined duration in order to determine the presence of a continuous tone, and means for generating a corresponding test message to said switch control unit.

2. The continuity check tone detector as recited in claim 1, wherein said detector interface means comprise:

a speech highway interface connected to receive said serial tone information and constituting a series-to-parallel converter for generating byte parallel tone samples;

a speech address decoder connected to receive speech address information from said switch control unit for generating first detector timing signals derived therefrom;

a signalling address decoder connected to receive signalling address information from said switch control unit and generating second detector timing signals derived from the signalling address information; and a signalling interface including a series-to-parallel converter connected to receive a signalling message from the switch control unit in series for converting the same into a signalling message byte; and a parallel-to-series converter connected to receive said test message from said control processor and designed for converting the same into test information supplied to said switch control unit in series.

3. The continuity check tone detector as recited in claim 2, wherein the digital signal processor constitutes a plurality of hardware sharing receiver channels being equally spaced in time and being operative independently from each other and being individually assigned to a respective one of temporarily established transmission paths under control of said switch control unit.

4. The continuity check tone detector as recited in claim 3, wherein the digital signal processor comprises:

processor devices each having data inputs and outputs and control inputs and including a multiplier/accumulator, a main memory, scratch pad register;

a signal processor bus being commonly connected to the data inputs and outputs of said processor devices; and a microsequencer constituting the control unit of the digital signal processor, having time control inputs connected to receive said detector timing signals for synchronization with the surrounding telecommunication system, and having control outputs furnishing in common a microcode word divided into sequences of control signals, wherein each control signal sequence is supplied to the control inputs of a respective one of said processor devices.

5. The continuity check tone detector as recited in claim 4, wherein said microsequencer comprises:

a programmable logic array having first inputs each connected to receive a respective one of said detector timing signals, second inputs and address outputs;

a sequencer memory having memory locations each storing a respective microcode word including said sequences of control signals and a step address specifying the subsequent sequencer step, said step address being furnished to said second inputs of the programmable logic array; and said sequencer memory having memory address inputs connected to said address outputs of said programmable logic array and memory outputs each furnishing a respective bit of a selected microcode word.

6. The continuity check tone detector as recited in claim 5, wherein said microsequencer further comprises an output buffer having inputs each being connected to a respective one of said sequencer memory outputs, having corresponding outputs connected to said signal processor bus and each furnishing a respective bit of said microcode word, and having a control input connected to receive an output enable signal.

7. The continuity check tone detector as recited in claim 6, wherein said digital signal processor is connected to receive a master clock signal furnished by said clock generator of said switch control unit for synchronizing the operation of the digital signal processor with the timing of a pulse frame of the telecommunication system, and wherein the digital signal processor includes a delay circuit connected to receive said master clock signal and to derive therefrom said output enable signal supplied to said microsequencer output buffer.

8. The continuity check tone detector as recited in claim 4, wherein said means for linearizing a tone sample include a linearization memory programmed in form of a translation table and having address inputs connected to receive said tone sample, and outputs furnishing said linearized tone sample.

9. The continuity check tone detector as recited in claim 8, wherein said linearization memory comprises:
two memory sections each storing a respective table for translating a tone sample into a linearized tone sample in accordance with A-Law and MU-Law, respectively; and
a control input for selecting a respective one of said linearization memory sections, said linearization memory control input being connected to receive a corresponding select signal from said switch control unit across said detector interface means.

10. The continuity check tone detector as recited in claim 4, wherein said means for digitally filtering a linearized tone sample include a coefficient memory constituting a table for storing coefficients determining the frequency response characteristic of said digital filter means.

11. The continuity check tone detector as recited in claim 10, wherein said coefficients of said digital filter means are determined in such a manner that the frequency response characteristic is a single frequency bandpass characteristic centered around a predetermined frequency of the continuous test tone.

12. The continuity check tone detector as recited in claim 11, wherein said coefficient memory is comprised of memory sections each storing a respective set of filter coefficients associated with a different one of test tone frequencies, and wherein the coefficient memory further comprises a select control input connected to receive a frequency select signal from said switch control unit across said detector interface means for selecting a respective one of said coefficient memory sections.

13. The continuity check tone detector as recited in claim 4, wherein the digital signal processor is designed to derive the root means square value as the measurement value of a filtered tone sample.

14. The continuity check tone detector as recited in claim 13, wherein the digital signal processor further comprises an output latch connected to receive output data across the signal processor bus, said output data corresponding to said root mean square value.

15. The continuity check tone detector as recited in claim 14, wherein the digital signal processor further comprises an output flip-flop connected to be set by a corresponding valid bit signal of the microcode word said valid bit signal being generated by the microsequencer at a time when data buffered in said signal processor output latch are valid.

16. The continuity check tone detector as recited in claim 15, wherein said digital signal processor further comprises an overflow detector connected to outputs of said multiplier/accumulator and being designed to detect an erroneous overflow condition of said multiplier/accumulator.

17. The continuity check tone detector as recited in claim 4, wherein the digital signal processor and the control processor are connected to receive said first and second detector timing signals, respectively for synchronizing the operations of both processors.

18. The continuity check tone detector as recited in claim 17, wherein the control processor is further connected to receive first processor control signals furnished by the switch control unit, said first processor control signals including an attenuation signal specifying an individual attenuation level for a respective one of the transmission paths currently under test, wherein this attenuation level is utilized for evaluating the measured tone level of the respective receiver channel in order to determine the presence of a test tone.

19. The continuity check tone detector as recited in claim 18, wherein the control processor comprises
means for independently counting the respective numbers of consecutive occurrences of a tone being present with respect to each receiver channel; and
means for monitoring said tone counting means for a predetermined minimum count representing a stable status of a continuous tone being present for a sufficient length of time, said monitoring means being designed to set a tone present bit signal in the test message upon detection of said minimum count and to reset said tone present bit signal whenever the evaluation of a measured tone level results in detecting an insufficient tone level.

20. The continuity check tone detector as recited in claim 19, wherein the control processor further comprises means for self-testing of the continuity check tone detector and for generating a channel individual out-of-service request signal being made part of the test message sent to the switch control unit; and wherein the control processor is connected to receive a reset signal constituting one of said first processor control signals, said reset signal being individually supplied with respect to each individual receiver channel for disabling the same.

21. The continuity check tone detector as recited in claim 20, wherein the control processor further comprises:
means for detecting the disabled status of all receiver channels and for setting a status signal representing this disabled condition in the test message; and
a display element constituting a status indicator for the continuity check tone detector and having an input connected to receive said status signal.

22. The continuity check tone detector as recited in claim 21, wherein the control processor has an interrupt input connected to receive an interrupt signal pulse being one of said first detector timing signals, and includes interrupt means responsive to each consecutive interrupt signal, forcing the control processor to reenter at the beginning of a service routine evaluating a measured tone level for the subsequent receiver channel, and setting an error bit signal in the test message if the current service routine is still incomplete upon occurrence of said interrupt signal.

23. The continuity check tone detector as recited in claim 22, wherein the control processor further comprises a reset input and a watchdog circuit constituting a resettable maximum time counter and having a control unit and an output connected to said reset input of the control processor; and wherein said self-testing means are designed to generate a clear signal upon termination of each service routine, said clear signal being furnished to said control input of the watchdog circuit for resetting the same.

* * * * *